US012232224B2

(12) United States Patent
Tucker et al.

(10) Patent No.: US 12,232,224 B2
(45) Date of Patent: Feb. 18, 2025

(54) FOLDED HEATER FOR ELECTRONIC VAPING DEVICE

(71) Applicant: Altria Client Services LLC, Richmond, VA (US)

(72) Inventors: Christopher S. Tucker, Midlothian, VA (US); Charles L. Dendy, Ruther Glen, VA (US); William J. Crowe, Richmond, VA (US); Christopher Ryan Newcomb, Powhatan, VA (US); Rangaraj S. Sundar, Richmond, VA (US); Isaac Weigensberg, Richmond, VA (US); David Rubli, Revava (IL)

(73) Assignee: Altria Client Services LLC, Richmond, VA (US)

( * ) Notice: Subject to any disclaimer, the term of this patent is extended or adjusted under 35 U.S.C. 154(b) by 602 days.

(21) Appl. No.: 15/729,909

(22) Filed: Oct. 11, 2017

(65) Prior Publication Data

US 2019/0104764 A1 Apr. 11, 2019

(51) Int. Cl.
*H05B 3/06* (2006.01)
*A24F 40/10* (2020.01)
(Continued)

(52) U.S. Cl.
CPC ............... *H05B 3/04* (2013.01); *A24F 40/46* (2020.01); *A24F 40/70* (2020.01); *A24F 40/10* (2020.01); *H05B 3/06* (2013.01); *H05B 3/12* (2013.01)

(58) Field of Classification Search
CPC .......... A24F 40/10; A24F 40/46; A24F 40/70; H05B 3/04; H05B 3/06; H05B 3/12; H05B 2203/017; H05B 3/42
See application file for complete search history.

(56) References Cited

U.S. PATENT DOCUMENTS 4,083,372 A 4/1978 Boden
5,034,721 A 7/1991 Benedictus
(Continued)

FOREIGN PATENT DOCUMENTS

CN 202489175 U 10/2012
CN 203446525 U 2/2014
(Continued)

OTHER PUBLICATIONS

International Search Report and Written Opinion for corresponding Application No. PCT/EP2019/070556, dated Nov. 22, 2019.
(Continued)

*Primary Examiner* — Nathaniel E Wiehe
*Assistant Examiner* — Dilnessa B Belay
(74) *Attorney, Agent, or Firm* — Harness, Dickey & Pierce, P.L.C.

(57) ABSTRACT

A folded heater of an electronic vaping device includes a first plurality of U-shaped segments arranged in a first direction and defining a first side of the heater and a second plurality of U-shaped segments arranged in the first direction and defining a second side of the heater. The second side is substantially parallel to the first side. The heater also includes a first lead portion and a second lead portion. The first plurality of U-shaped segments, the second plurality of U-shaped segments, the first lead portion, and the second lead portion are a single integral member.

24 Claims, 12 Drawing Sheets

(51) Int. Cl.

| | |
|---|---|
| *A24F 40/46* | (2020.01) |
| *A24F 40/70* | (2020.01) |
| *H05B 3/04* | (2006.01) |
| *H05B 3/12* | (2006.01) |

(56) References Cited

U.S. PATENT DOCUMENTS 5,388,594 A * 2/1995 Counts .................. A24F 40/485 131/194
5,665,262 A 9/1997 Hajaligol et al.
5,750,964 A 5/1998 Counts et al.
6,155,268 A 12/2000 Takeuchi
6,603,924 B2 8/2003 Brown et al.
6,719,405 B1 4/2004 Powers
8,191,555 B2 6/2012 Herbrich et al.
8,375,957 B2 2/2013 Hon
8,393,331 B2 3/2013 Hon
D688,415 S 8/2013 Kim
8,499,766 B1 8/2013 Newton
8,528,569 B1 9/2013 Newton
D693,053 S 11/2013 Chen
D695,450 S 12/2013 Benassayag et al.
8,746,240 B2 6/2014 Terry et al.
8,757,147 B2 6/2014 Terry et al.
8,794,231 B2 8/2014 Thorens et al.
8,833,364 B2 9/2014 Buchberger
8,851,068 B2 10/2014 Cohen et al.
D720,095 S 12/2014 Alima
D720,496 S 12/2014 Alima
D720,881 S 1/2015 Liu
D724,782 S 3/2015 Wu
D728,155 S 4/2015 Liu
D728,156 S 4/2015 Wu
D729,441 S 5/2015 Hua
9,055,617 B2 6/2015 Thorens et al.
9,072,321 B2 7/2015 Liu
9,095,175 B2 8/2015 Terry et al.
9,101,729 B2 8/2015 Liu
9,210,738 B2 12/2015 Ward et al.
9,210,739 B2 12/2015 Chabach et al.
D748,852 S 2/2016 Wu
D749,260 S 2/2016 Wu
D751,249 S 3/2016 Chen
9,271,525 B2 3/2016 Liu
9,282,772 B2 3/2016 Tucker et al.
9,289,014 B2 3/2016 Tucker et al.
D758,649 S 6/2016 Liu
D764,703 S 8/2016 Liu
D765,307 S 8/2016 Liu
9,420,829 B2 8/2016 Thorens et al.
9,427,711 B2 8/2016 Terry et al.
D765,907 S 9/2016 Liu
9,439,455 B2 9/2016 Alarcon et al.
D774,247 S 12/2016 Chen
9,510,623 B2 12/2016 Tucker et al.
D778,492 S 2/2017 Liu
D778,493 S 2/2017 Scott
D780,372 S 2/2017 Liu
D784,610 S 4/2017 Bosch
D785,859 S 5/2017 Pang
9,949,510 B2 4/2018 Liu
D827,195 S 8/2018 Chen
D833,064 S 11/2018 Verleur et al.
D834,246 S 11/2018 Qiu
D835,337 S 12/2018 Beer et al.
D835,574 S 12/2018 Trongone
10,226,076 B2 3/2019 Althorpe et al.
10,440,997 B2 10/2019 Borkovec et al.
10,506,827 B2 12/2019 Guo et al.
10,687,557 B2 6/2020 Tucker et al.
10,772,356 B2 9/2020 Tucker et al.
10,932,496 B2 3/2021 Tucker et al.
11,245,235 B2 2/2022 Patil et al.
11,930,843 B2 3/2024 Tasselli et al.
2006/0231641 A1 10/2006 Uchiyama et al.
2010/0293979 A1* 11/2010 Shei ........................ A47J 36/24 62/258
2011/0126848 A1 6/2011 Zuber et al.
2011/0155153 A1* 6/2011 Thorens ................... H05B 3/58 131/329
2013/0019887 A1 1/2013 Liu
2013/0192623 A1 8/2013 Tucker et al.
2013/0213419 A1* 8/2013 Tucker .................... A24F 40/46 131/328
2013/0255675 A1 10/2013 Liu
2013/0306064 A1 11/2013 Thorens et al.
2013/0306065 A1 11/2013 Thorens et al.
2014/0048086 A1 2/2014 Zhanghua
2014/0053856 A1 2/2014 Liu
2014/0261487 A1 9/2014 Chapman et al.
2014/0270729 A1 9/2014 DePiano et al.
2014/0283855 A1 9/2014 Hawes et al.
2014/0283859 A1 9/2014 Minskoff et al.
2014/0345635 A1 11/2014 Rabinowitz et al.
2015/0020823 A1 1/2015 Lipowicz et al.
2015/0027470 A1 1/2015 Kane et al.
2015/0083147 A1 3/2015 Schiff et al.
2015/0101625 A1 4/2015 Newton et al.
2015/0128973 A1 5/2015 Li et al.
2015/0144145 A1 5/2015 Chang et al.
2015/0181930 A1 7/2015 Liu
2015/0181944 A1 7/2015 Li et al.
2015/0216233 A1 8/2015 Sears et al.
2015/0216234 A1 8/2015 Chung
2015/0216236 A1 8/2015 Bless et al.
2015/0245654 A1 9/2015 Memari et al.
2015/0245658 A1 9/2015 Worm et al.
2015/0245669 A1 9/2015 Cadieux et al.
2015/0272217 A1 10/2015 Chen
2015/0305408 A1* 10/2015 Liu .......................... H05B 3/06 392/404
2015/0305410 A1 10/2015 Liu
2015/0313275 A1 11/2015 Anderson et al.
2015/0313282 A1 11/2015 Ademe et al.
2015/0328415 A1 11/2015 Minskoff et al.
2015/0335075 A1 11/2015 Minskoff et al.
2015/0351456 A1 12/2015 Johnson et al.
2015/0359265 A1 12/2015 Liu
2016/0057811 A1 2/2016 Alarcon et al.
2016/0073694 A1 3/2016 Liu
2016/0091194 A1 3/2016 Liu
2016/0100633 A1 4/2016 Gao
2016/0106153 A1 4/2016 Zhu
2016/0135505 A1 5/2016 Li et al.
2016/0150828 A1 6/2016 Goldstein et al.
2016/0183596 A1 6/2016 Rado
2016/0192709 A1 7/2016 Liu
2016/0227837 A1 8/2016 Hammel et al.
2016/0242466 A1 8/2016 Lord et al.
2016/0262453 A1 9/2016 Ampolini et al.
2016/0309785 A1 10/2016 Holtz
2016/0309786 A1* 10/2016 Holtz ....................... H05B 3/06
2016/0309787 A1 10/2016 Hawes et al.
2016/0309788 A1 10/2016 Hawes et al.
2016/0324216 A1 11/2016 Li et al.
2016/0331037 A1 11/2016 Cameron
2016/0345633 A1* 12/2016 DePiano ................. A24F 40/46
2016/0360789 A1 12/2016 Hawes et al.
2016/0363917 A1 12/2016 Blackley
2016/0366931 A1 12/2016 Zhang
2016/0366947 A1 12/2016 Monsees et al.
2017/0000192 A1 1/2017 Li
2017/0013880 A1 1/2017 O'Brien et al.
2017/0027227 A1 2/2017 Lipowicz
2017/0042240 A1 2/2017 Murison
2017/0064999 A1 3/2017 Perez et al.
2017/0079323 A1 3/2017 Wang
2017/0105450 A1 4/2017 Reed et al.
2017/0135405 A1 5/2017 Reevell
2017/0150757 A1 6/2017 Worm et al.
2017/0174914 A1 6/2017 Matsumura et al.
2017/0224016 A1 8/2017 Reevell
2017/0231283 A1 8/2017 Gadas
2017/0231286 A1 8/2017 Borkovec et al.

(56) References Cited

U.S. PATENT DOCUMENTS

| | | | |
|---|---|---|---|
| 2017/0265523 A1 | 9/2017 | Lipowicz | |
| 2017/0273354 A1 | 9/2017 | Tucker et al. | |
| 2017/0325502 A1 | 11/2017 | Nelson et al. | |
| 2018/0007966 A1 | 1/2018 | Li et al. | |
| 2018/0027879 A1 | 2/2018 | Gavrielov et al. | |
| 2018/0077967 A1 | 3/2018 | Hatton et al. | |
| 2018/0161525 A1 | 6/2018 | Liu et al. | |
| 2018/0303163 A1 | 10/2018 | Baker et al. | |
| 2019/0133187 A1 | 5/2019 | Spencer et al. | |
| 2019/0269178 A1 | 9/2019 | Karles et al. | |
| 2019/0373679 A1 | 12/2019 | Fu et al. | |
| 2019/0387805 A1 | 12/2019 | Rostami | |
| 2020/0029619 A1 | 1/2020 | Sundberg et al. | |
| 2020/0120984 A1 | 4/2020 | Rogan | |
| 2021/0176826 A1 | 6/2021 | Tucker et al. | |

FOREIGN PATENT DOCUMENTS

| | | | |
|---|---|---|---|
| CN | 203538371 | U | 4/2014 |
| CN | 203762291 | U | 8/2014 |
| CN | 104219973 | A | 12/2014 |
| CN | 104244749 | A | 12/2014 |
| CN | 104720115 | A | 6/2015 |
| CN | 105101507 | A | 11/2015 |
| CN | 105188428 | A | 12/2015 |
| CN | 105455198 | A | 4/2016 |
| CN | 105530825 | A | 4/2016 |
| CN | 106231933 | A | 12/2016 |
| CN | 106455711 | A | 2/2017 |
| CN | 205947122 | U | 2/2017 |
| CN | 107072293 | A | 8/2017 |
| CN | 107072314 | A | 8/2017 |
| CN | 107752129 | A | 3/2018 |
| CN | 207613205 | U | 7/2018 |
| EA | 000244 | B1 | 2/1999 |
| EM | 002337410-0009 | | 11/2013 |
| EM | 002337410-0012 | | 11/2013 |
| EM | 002403444-0003 | | 2/2014 |
| EM | 002412106-0001 | | 3/2014 |
| EM | 001420327-0005 | | 11/2017 |
| EP | 0973419 | A1 | 1/2000 |
| EP | 2404515 | A1 | 1/2012 |
| EP | 2574247 | A1 | 4/2013 |
| EP | 3015010 | A1 | 5/2016 |
| EP | 3075270 | A1 | 10/2016 |
| EP | 3135139 | A1 | 3/2017 |
| EP | 3348154 | A1 | 7/2018 |
| ES | D0518506-03 | | 1/2013 |
| ES | D0517952-09 | | 10/2013 |
| ES | D0518082-12 | | 11/2013 |
| ES | D0518097-04 | | 11/2013 |
| ES | D0518201-12 | | 11/2013 |
| ES | D0518036-03 | | 12/2013 |
| ES | D0518299-03 | | 12/2013 |
| ES | D0518462-09 | | 1/2014 |
| ES | D0519904-04 | | 9/2014 |
| GB | 719318 | A | 12/1954 |
| GB | 4032478 | | 11/2013 |
| JP | 2016-511008 | A | 4/2016 |
| JP | 2017-512470 | A | 5/2017 |
| JP | 3210447 | U | 5/2017 |
| JP | 3213257 | U | 10/2017 |
| JP | 2019-524121 | A | 9/2019 |
| KR | 10-1486294 | B1 | 1/2015 |
| PL | 21430-0001 | | 5/2015 |
| PT | 3429-0001 | | 11/2013 |
| PT | 3428-0003 | | 12/2013 |
| PT | 3771-0007 | | 8/2014 |
| RS | 9612-0001 | | 3/2000 |
| RU | 2604313 | C2 | 12/2016 |
| RU | 2607067 | C2 | 1/2017 |
| RU | 2620754 | C2 | 5/2017 |
| RU | 2627002 | C2 | 8/2017 |
| RU | 2638514 | C2 | 12/2017 |
| RU | 2639972 | C2 | 12/2017 |
| RU | 2644314 | C2 | 2/2018 |
| TR | 201307255-0001 | | 1/2014 |
| WO | WO-9406314 | A1 | 3/1994 |
| WO | WO-2007/078273 | A1 | 7/2007 |
| WO | 2014/066730 | A1 | 5/2014 |
| WO | WO-2014/150979 | A2 | 9/2014 |
| WO | WO-2015/027470 | A1 | 3/2015 |
| WO | 2015/124688 | A1 | 8/2015 |
| WO | WO-2015/114327 | A1 | 8/2015 |
| WO | 2015131428 | A1 | 9/2015 |
| WO | WO-2015/144822 | A1 | 10/2015 |
| WO | WO-2016/065926 | A1 | 5/2016 |
| WO | WO-2016/079152 | A1 | 5/2016 |
| WO | WO-2016/144966 | A1 | 9/2016 |
| WO | WO-2016/156509 | A1 | 10/2016 |
| WO | WO-2016/172441 | A1 | 10/2016 |
| WO | WO-2016/172448 | A1 | 10/2016 |
| WO | WO-2016154994 | A1 | 10/2016 |
| WO | WO-2016162492 | A1 | 10/2016 |
| WO | WO-2017/017970 | A1 | 2/2017 |
| WO | WO-2017021536 | A2 | 2/2017 |
| WO | WO-2017/055802 | A1 | 4/2017 |
| WO | 2017/084849 | A1 | 5/2017 |
| WO | WO-2017/144703 | A1 | 8/2017 |
| WO | WO-2017/162691 | A1 | 9/2017 |
| WO | 2017/205692 | A1 | 11/2017 |
| WO | WO-2017/186477 | A1 | 11/2017 |
| WO | 2018/102696 | A1 | 6/2018 |

OTHER PUBLICATIONS

United States Notice Of Allowance for U.S. Appl. No. 29/621,730, dated Aug. 14, 2019.

Written Opinion of the International Preliminary Examining Authority dated Jun. 10, 2020 for corresponding International Application No. PCT/EP2019/070559.

International Search Report and Written Opinion for corresponding Application No. PCT/EP2019/070559, dated Dec. 12, 2019.

U.S. Appl. No. 15/729,895, filed Oct. 11, 2017.

U.S. Appl. No. 29/621,730, filed Oct. 11, 2017.

United States Office Action for corresponding U.S. Appl. No. 29/621,730 dated Dec. 17, 2018.

United States Office Action for U.S. Appl. No. 15/858,425, dated Oct. 10, 2019.

U.S. Office Action dated Mar. 3, 2021 for corresponding U.S. Appl. No. 16/049,450.

U.S. Notice of Allowance dated Jan. 29, 2020 for corresponding U.S. Appl. No. 15/858,425.

Atomizer & Coil: Authentic GS-H5L 3.0 ml BCC Atomizer with LED light, http://www.ecigaretteb2c.com (Year: 2014).

United States Office Action for U.S. Appl. No. 15/729,895, dated Jan. 23, 2020.

International Search Report and Written Opinion dated Mar. 20, 2019 for International Application No. PCT/EP2018/086849.

International Preliminary Report on Patentability for Application No. PCT/EP2019/070556, dated Jun. 30, 2020.

U.S. Notice of Allowance dated Feb. 24, 2020 for corresponding U.S. Appl. No. 15/858,425.

International Preliminary Report on Patentability and Written Opinion thereof dated Jul. 9, 2020 for International Application No. PCT/EP2018/086849.

U.S. Appl. No. 15/349,377, filed Nov. 11, 2016.

U.S. Notice of Allowance dated Oct. 27, 2020 for corresponding U.S. Appl. No. 15/931,999.

International Preliminary Report on Patentability dated Apr. 23, 2020 for corresponding International Application No. PCT/EP2018/077806.

U.S. Notice of Allowance dated May 6, 2020 for corresponding U.S. Appl. No. 15/729,895.

"The Stunning High Tech PCC Love eCig Smart Pod Starter Kit"—http://www.sbwire.com/press-releases/the-stunning-high-tech-pcc-love-ecig-smart-pod-starter-kit-147288.htm.

International Search Report and Written Opinion thereof dated Jan. 22, 2019 for corresponding International Application No. PCT/EP2018/077806.

(56) References Cited

OTHER PUBLICATIONS

Innokin Recommends New Electronic Cigarette to Smokers, last updated May 18, 2017.
T Spindle, "Examination of Electronic Cigarette User Puff Topography: the Effect of a Mouthpiece-Based Topography Measurement Device on Plasma Nicotine and Subjective Effects", VCU Scholars Compass, Sep. 2015.
International Search Report and Written Opinion thereof dated Jan. 21, 2019 for corresponding International Application No. PCT/EP2018/077799.
U.S. Office Action dated Sep. 20, 2021 for corresponding U.S. Appl. No. 16/049,450.
U.S. Office Action dated Nov. 3, 2021 for corresponding U.S. Appl. No. 16/049,346.
U.S. Office Action dated Dec. 14, 2021 for corresponding U.S. Appl. No. 16/049,450.
Russian Office Action and Search Report dated Nov. 26, 2021 for corresponding Russian Application No. 2020114678, and English-language translation thereof.
Russian Office Action and Search Report dated Nov. 25, 2021 for corresponding Russian Application No. 2020115145, and English-language translation thereof.
European Notice of Allowance dated Aug. 25, 2021 for corresponding European Application No. 18829884.8.
Russian Office Action and Search Report dated Dec. 23, 2021 for corresponding Russian Application No. 2020123230, and English-language translation thereof.
U.S. Notice of Allowance dated Mar. 22, 2022 for corresponding U.S. Appl. No. 16/049,450.
European Office Action dated Mar. 29, 2022 for corresponding European Application No. 19752663.5.
Russian Office Action dated Apr. 8, 2022 for corresponding Russian Application No. 2020115145, and English-language translation thereof.
Russian Notice of Allowance dated Apr. 14, 2022 for corresponding Russian Application No. 2020114678, and English-language translation thereof.
U.S. Office Action dated May 16, 2022 for corresponding U.S. Appl. No. 16/049,346.
Russian Notice of Allowance dated Jul. 14, 2022 for corresponding Russian Application No. 2020115145, and English-language translation thereof.
Brazilian Office Action dated Jul. 21, 2022 for corresponding Brazilian Application No. BR112020010419-1, and English-language translation thereof.
U.S. Notice of Allowance dated Apr. 27, 2022 for corresponding U.S. Appl. No. 16/049,450.
Russian Notice of Allowance dated Apr. 28, 2022 for corresponding Russian Application No. 2020123230, and English-language translation thereof.
U.S. Office Action dated Sep. 1, 2022 for corresponding U.S. Appl. No. 16/992,810.
Brazilian Office Action dated Aug. 9, 2022 for corresponding Brazilian Application No. BR112020005293-0, and English-language translation thereof.
Japanese Notice of Allowance dated Jan. 30, 2023 for corresponding Japanese Application No. 2020-518434, and English-language translation thereof.
U.S. Notice of Allowance dated Dec. 27, 2022 for corresponding U.S. Appl. No. 16/049,346.
U.S. Notice of Allowance dated Dec. 27, 2022 for corresponding U.S. Appl. No. 16/049,450.
Brazilian Office Action published in the Brazilian Industrial Property Journal dated Sep. 20, 2022 for corresponding Brazilian Application No. 112020006347-9, and English-language translation thereof.
U.S. Notice of Allowance dated Oct. 7, 2022 for corresponding U.S. Appl. No. 16/049,346.
U.S. Notice of Allowance dated Oct. 26, 2022 for corresponding U.S. Appl. No. 16/049,450.
U.S. Notice of Allowance dated Sep. 29, 2022 for corresponding U.S. Appl. No. 16/049,346.
Japanese Office Action for corresponding Application No. 2020-517203, dated Oct. 13, 2022, English translation included.
Japanese Office Action dated Oct. 19, 2022 for corresponding Japanese Application No. 2020-518434, and English-language translation thereof.
U.S. Notice of Allowance dated Nov. 18, 2022 for corresponding U.S. Appl. No. 16/049,346.
U.S. Notice of Allowance dated Nov. 21, 2022 for corresponding U.S. Appl. No. 16/049,346.
U.S. Notice of Allowance dated Nov. 25, 2022 for corresponding U.S. Appl. No. 17/155,246.
Russian Office Action and Search Report dated Nov. 17, 2022 for corresponding Russian Application No. 2021104907, and English-language translation thereof.
U.S. Notice of Allowance dated Dec. 14, 2022 for corresponding U.S. Appl. No. 17/155,246.
Chinese Office Action and Search Report dated Feb. 18, 2023 for corresponding Chinese Application No. 201880060418.8, and English-language translation thereof.
U.S. Notice of Allowance dated Jun. 29, 2023 for U.S. Appl. No. 16/049,450.
Russian Notice of Allowance dated Apr. 10, 2023 for Russian Application No. 2021104907, and English-language translation thereof.
Korean Office Action dated Jul. 13, 2023 issued in Korean Patent Application No. 10-2020- 7012756 and English translation thereof.
Chinese Office Action dated Mar. 1, 2023 for Chinese Application No. 201880078750.7 and English-language translation thereof.
Japanese Office Action dated Dec. 12, 2022 for Japanese Application No. 2020-533704, and English-language translation thereof.
Chinese Office Action dated Jan. 29, 2023 for Chinese Application No. 201880060406.5, and English-language translation thereof.
Japanese Notice of Allowance dated Mar. 13, 2023 for Japanese Patent Application No. 2020-533704 and English translation thereof.
Brazilian Office Action dated Feb. 28, 2023 for Brazilian Application No. BR112020026871-2 and English translation thereof.
Notice of Allowance dated Mar. 2, 2023 issued in U.S. Appl. No. 16/992,810.
Russian Decision to Grant and Search Report dated Mar. 1, 2023 for Russian Application No. 2021103129, and English-language translation thereof.
Notice of Allowance dated Mar. 9, 2023 issued in U.S. Appl. No. 17/155,246.
U.S. Notice of Allowance dated Apr. 3, 2023 for U.S. Appl. No. 16/049,346.
U.S. Notice of Allowance dated Mar. 31, 2023 for U.S. Appl. No. 16/049,450.
Office Action dated May 15, 2023 issued in Japanese patent application No. 2021-503600 and English translation thereof.
Office Action dated Jun. 2, 2023 issued in U.S. Appl. No. 16/992,810.
Office Action dated May 29, 2023 issued in Japanese patent application No. 2020-517203 and English translation thereof.
Notice of Allowance dated Sep. 14, 2023 issued in U.S. Appl. No. 16/992,810.
Chinese Office Action dated Jun. 28, 2023 for Chinese Application No. 201880060406.5, and English-language translation thereof.
Japanese Office Action dated Jun. 15, 2023 for Japanese Application No. 2021-500282, and English-language translation thereof.
Chinese Office Action dated Nov. 9, 2023 for corresponding Chinese Application No. 201880060418.8, and English-language translation thereof.
Office Action and Search Report dated Oct. 21, 2023 issued in Chinese patent application No. 201980045676.3 and English translation thereof.
Notice of Allowance dated Nov. 8, 2023 issued in U.S. Appl. No. 16/049,450.
Notice of Allowance dated Nov. 14, 2023 issued in U.S. Appl. No. 16/049,346.
Japanese Decision to Grant dated Oct. 5, 2023 for Japanese Application No. 2021-503600, and English-language translation thereof.

(56) References Cited

OTHER PUBLICATIONS

Korean Office Action dated Aug. 18, 2023 for corresponding Korean Application No. 10-2020-7012757, and English-language translation thereof.
Japanese Decision to Grant dated Oct. 26, 2023 for Japanese Application No. 2021-500282, and English-language translation thereof.
Chinese Office Action dated Nov. 30, 2023 for Chinese Application No. 201880078750.7, and English-language translation thereof.
Korean Office Action dated Nov. 24, 2023 for Korean Application No. 10-2020-7019287, and English-language translation thereof.
Chinese Office Action and Search Report dated Nov. 23, 2023 for Chinese Application No. 201980045660.2, and English-language translation thereof.
Japanese Decision of Rejection dated Dec. 4, 2023 issued in Japanese patent application No. 2020-517203.
Notice of Allowance issued Feb. 14, 2024 in U.S. Appl. No. 16/992,810.
Notice of Allowance issued Feb. 21, 2024 in U.S. Appl. No. 16/049,346.
Notice of Allowance issued Mar. 14, 2024 in U.S. Appl. No. 16/992,810.
Notice of Allowance issued Mar. 13, 2024 in U.S. Appl. No. 18/352,407.
Notice of Allowance issued Apr. 3, 2024 in U.S. Appl. No. 17/155,246.
Chinese Notice of Allowance for Chinese Patent Application No. 201880078750.7 mailed on Apr. 1, 2024.
Notice of Allowance dated Jun. 17, 2024 issued in Japanese Patent Application No. 2020-517203.
Result of Consultation dated Jun. 5, 2024 issued in European Patent Application No. 19752663.5.
Office Action dated Jun. 26, 2024 issued in U.S. Appl. No. 16/049,450.
Office Action dated Mar. 31, 2024 issued in Chinese patent application No. 201880060418.8.
Office Action dated Feb. 28, 2024 issued in Korean patent application No. 10-2020-7012756.
Notice of Allowance dated Feb. 26, 2024 issued in Korean patent application No. 10-2020-7012757.
Notice of Allowance dated Apr. 12, 2024 issued in U.S. Appl. No. 16/049,450.
Office Action issued Jun. 20, 2024 in Chinese Application No. 201880060418.8.
Notice of Allowance issued Jul. 26, 2024 in U.S. Appl. No. 16/992,810.
Office Action dated Aug. 7, 2024 issued in U.S. Appl. No. 18/411,538.
Office Action dated Aug. 7, 2024 issued in U.S. Appl. No. 16/992,810.
Notice of Allowance dated Jul. 24, 2024 issued in Korean patent application No. 10-2020-7012756 and English translation thereof.
Office Action mailed Aug. 20, 2024 issued in Brazilian Patent Application No. 1120200052930.
Notice of Allowance dated Oct. 1, 2024 issued in U.S. Appl. No. 17/893,614.
Office Action dated Sep. 14, 2024 issued in Korean patent application No. 10-2021-7004399.
Notice of Allowance dated Nov. 29, 2024 issued in U.S. Appl. No. 16/992,810.
Notice of Allowance dated Dec. 2, 2024 issued in U.S. Appl. No. 16/049,450.
Notice of Allowance dated Dec. 18, 2024 issued in U.S. Appl. No. 18/411,538.
Notice of Allowance dated Dec. 20, 2024 issued in U.S. Appl. No. 18/411,538.

* cited by examiner

FOLDED HEATER FOR ELECTRONIC VAPING DEVICE

BACKGROUND

Field

The present disclosure relates to a folded heater for an electronic vaping or e-vaping device.

Description of Related Art

An e-vaping device includes a heater element which vaporizes a pre-vapor formulation to produce a "vapor."

The e-vaping device includes a power supply, such as a rechargeable battery, arranged in the device. The battery is electrically connected to the heater, such that the heater heats to a temperature sufficient to convert a pre-vapor formulation to a vapor. The vapor exits the e-vaping device through a mouthpiece including at least one outlet.

SUMMARY

At least one example embodiment relates to a folded heater of an electronic vaping device.

In at least one example embodiment, a folded heater of an electronic vaping device includes a first plurality of U-shaped segments arranged in a first direction and defining a first side of the heater; a second plurality of U-shaped segments arranged in the first direction and defining a second side of the heater, the second side substantially parallel to the first side; a first lead portion; and a second lead portion. The first plurality of U-shaped segments, the second plurality of U-shaped segments, the first lead portion, and the second lead portion are a single integral member.

In at least one example embodiment, at least one of the first plurality of U-shaped segments is connected to at least one of the second plurality of U-shaped segments by one of a third plurality of U-shaped segments. Each of the third plurality of U-shaped segments includes a folded portion. The third plurality of U-shaped segments extend in a second direction. The second direction is substantially perpendicular to the first direction.

In at least one example embodiment, the folded portion has a width ranging from about 0.5 mm to about 2.0 mm. Each of the first plurality of U-shaped segments, each of the second plurality of U-shaped segments, and each of the third plurality of U-shaped segment include at least one side and a tip. The tips have at least one of a rounded shape, a rectangular shape, a square shape, and a triangular shape. A width of each of the tips of the first plurality of U-shaped segments, the second plurality of U-shaped segments, and the third plurality of U-shaped segments is greater than a width of each of the sides of the at least one of the first plurality of U-shaped segments, the second plurality of U-shaped segments, and the third plurality of U-shaped segments. In at least one example embodiment, a width of each of the tips ranges from about 0.25 mm to about 0.50 mm. In at least one example embodiment, a width of each of the side ranges from about 0.05 mm to about 0.20 mm. The first lead portion and the second lead portion each have a width greater than the width of the side. The width of the first lead portion and the second lead portion ranges from about 1.0 mm to about 3.0 mm. The width of the tip of the at least one of the first plurality of U-shaped segments is substantially the same as the width of the tip of the at least one of the second plurality of U-shaped segments. The tip of the at least one of the first plurality of U-shaped segments is offset from the tip of the at least one of the second plurality of U-shaped segments.

In at least one example embodiment, the first plurality of U-shaped segments is spaced apart from the second plurality of U-shaped segments by a distance ranging from about 0.5 mm to about 2.0 mm.

In at least one example embodiment, the folded heater has a resistance ranging from about 0.5 ohms to about 5.0 ohms.

In at least one example embodiment, the folded heater is formed of Nichrome. In other example embodiments, the folded heater is formed of stainless steel (e.g., 304, 316, 304L, or 316L). The folded heater has a thickness ranging from about 0.05 mm to about 0.50 mm.

In at least one example embodiment, the first plurality of U-shaped segments are in a first plane and the second plurality of U-shaped segments are in a second plane. The second plane is different from the first plane.

In at least one example embodiment, each of the first plurality of U-shaped segments and each of the first plurality of U-shaped segments includes at least one side and a tip. The tip has at least one of a rounded shape, a rectangular shape, a square shaped, and a triangular shape.

At least one example embodiment relates to a cartridge of an electronic vaping device.

In at least one example embodiment, a cartridge of an electronic vaping device includes a reservoir configured to store a pre-vapor formulation; a wick in fluid communication with the reservoir; and a folded heater partially surrounding a portion of the wick. The folded heater includes a first plurality of U-shaped segments arranged in a first direction and defining a first side of the heater, a second plurality of U-shaped segments arranged in the first direction and defining a second side of the heater, the second side substantially parallel to the first side, a first lead portion, and a second lead portion. The first plurality of U-shaped segments, the second plurality of U-shaped segments, the first lead portion, and the second lead portion are a single integral member.

In at least one example embodiment, the first plurality of U-shaped segments are in a first plane and the second plurality of U-shaped segments are in a second plane. The second plane is different from the first plane.

In at least one example embodiment, at least one of the first plurality of U-shaped segments is connected to at least one of the second plurality of U-shaped segments by one of a third plurality of U-shaped segments. Each of the third plurality of U-shaped segments includes a folded portion.

At least one example embodiment relates to an electronic vaping device.

In at least one example embodiment, an electronic vaping device comprises a reservoir configured to store a pre-vapor formulation; a wick in fluid communication with the reservoir; a folded heater partially surrounding a portion of the wick; and a power supply electrically connectable to the folded heater. The folded heater includes a first plurality of U-shaped segments arranged in a first direction and defining a first side of the heater, a second plurality of U-shaped segments arranged in the first direction and defining a second side of the heater, the second side substantially parallel to the first side, a first lead portion, and a second lead portion. The first plurality of U-shaped segments, the second plurality of U-shaped segments, the first lead portion, and the second lead portion are a single integral member.

At least one example embodiment relates to a folded heater.

In at least one example embodiment, a folded heater comprises a first plurality of U-shaped portions extending in a first direction, such that the first plurality of U-shaped portions have U-shaped tips disposed in different planes, each of a number of the first plurality of U-shaped portions having a first leg and a second leg, the first leg connected a second leg of a previous one of the first plurality of U-shaped portions by one of the first plurality of U-shaped portions by one of a second plurality of U-shaped portions, the second leg connected to a subsequent leg by one of a third plurality of U-shaped portion.

In at least one example embodiment, each of the first plurality of U-shaped portions is in a different plane.

In at least one example embodiment, each of the second plurality of portions is in a first plane and each of the third plurality of portions is in a second plane, the first plane being different from the second plane, and the first plane and the second plane being substantially perpendicular to each of the first plurality of U-shaped portions.

At least one example embodiment relates to a method of forming a heater assembly.

In at least one example embodiment, a method of forming a heater assembly comprises shaping a heater from a sheet of metal, the heater including, a first plurality of U-shaped segments arranged in a first direction and defining a first side of the heater, a second plurality of U-shaped segments arranged in the first direction and defining a second side of the heater, the second side substantially parallel to the first side, a first lead portion, a second lead portion, the first plurality of U-shaped segments, the second plurality of U-shaped segments, the first lead portion, and the second lead portion being a single integral member; and folding the heater along straight portions between the first plurality of U-shaped segments and the second plurality of U-shaped segments, such that the first plurality of U-shaped segments is substantially parallel to and spaced apart from the second plurality of U-shaped segments to form a folded heater.

In at least one example embodiment, the method may include positioning a sheet of wicking material within the folded heater.

In at least one example embodiment, the method may include positioning a sheet of wicking material along the straight portions prior to the folding.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION OF EXAMPLE EMBODIMENTS

Figure 1:
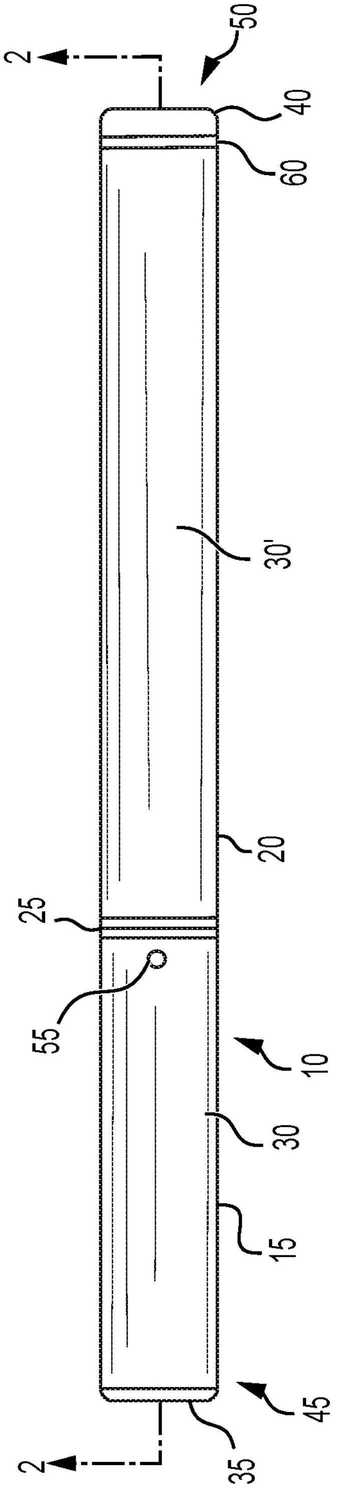
FIG. 1 is a side view of an electronic vaping device according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a side view of an e-vaping device according to at least one example embodiment.

In at least one example embodiment, as shown in FIG. 1, an electronic vaping device (e-vaping device) 10 may include a replaceable cartridge (or first section) 15 and a reusable battery section (or second section) 20, which may be coupled together at a threaded connector 25. It should be appreciated that the connector 25 may be any type of connector, such as a snug-fit, detent, clamp, bayonet, and/or clasp. An air inlet 55 extends through a portion of the connector 25.

In at least one example embodiment, the connector 25 may be the connector described in U.S. patent application Ser. No. 15/154,439, filed May 13, 2016, the entire contents of which is incorporated herein by reference thereto. As described in U.S. patent application Ser. No. 15/154,439, filed May 13, 2016, the entire content of which is incorporated herein by reference thereto, the connector 25 may be formed by a deep drawn process. As described in U.S. patent application Ser. No. 15/349,377, filed Nov. 11, 2016, the entire content of which is incorporated herein by reference thereto, the connector 25 may be formed by an in molding process.

In at least one example embodiment, the first section 15 may include a first housing 30 and the second section 20 may include a second housing 30'. The e-vaping device 10 includes a mouth-end insert 35 at a first end 45.

In at least one example embodiment, the first housing 30 and the second housing 30' may have a generally cylindrical cross-section. In other example embodiments, the housings 30 and 30' may have a generally triangular cross-section along one or more of the first section 15 and the second section 20. Furthermore, the housings 30 and 30' may have the same or different cross-section shape, or the same or different size. As discussed herein, the housings 30, 30' may also be referred to as outer or main housings.

In at least one example embodiment, the e-vaping device 10 may include an end cap 40 at a second end 50 of the e-vaping device 10. The e-vaping device 10 also includes a light 60 between the end cap 40 and the first end 45 of the e-vaping device 10.

Figure 2:
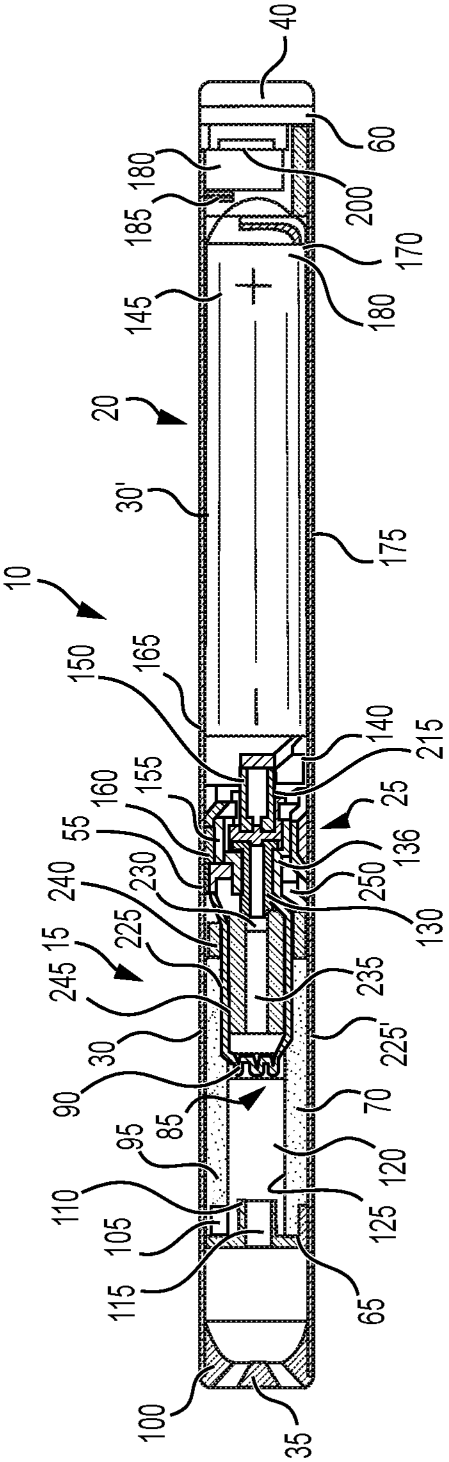
FIG. 2 is a cross-sectional view along line II-II of the electronic vaping device of FIG. 1 according to at least one example embodiment.

FIG. 2 is a cross-sectional view along line II-II of the e-vaping device of FIG. 1.

In at least one example embodiment, as shown in FIG. 2, the first section 15 may include a reservoir 95 configured to store a pre-vapor formulation and a vaporizer 80 that may vaporize the pre-vapor formulation. The vaporizer 80 includes a heating element 85 and a wick 90. The wick 90 may draw the pre-vapor formulation from the reservoir 95. The e-vaping device 10 may include the features set forth in U.S. Patent Application Publication No. 2013/0192623 to Tucker et al. filed Jan. 31, 2013 and/or features set forth in U.S. patent application Ser. No. 15/135,930 to Holtz et al, filed Apr. 22, 2016, the entire contents of each of which are incorporated herein by reference thereto. In other example embodiments, the e-vaping device may include the features set forth in U.S. patent application Ser. No. 15/135,923 filed Apr. 22, 2016, and/or U.S. Pat. No. 9,289,014 issued Mar. 22, 2016, the entire contents of each of which is incorporated herein by this reference thereto.

In at least one example embodiment, the pre-vapor formulation is a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol. The pre-vapor formulation may further include plant material, such as tobacco material or non-tobacco material.

In at least one example embodiment, the first section 15 may include the housing 30 extending in a longitudinal direction and an inner tube (or chimney) 70 coaxially positioned within the housing 30.

In at least one example embodiment, a first connector piece 155 may include a male threaded section for affecting the connection between the first section 15 and the second section 20.

At an upstream end portion of the inner tube 70, a nose portion 245 of a gasket (or seal) 240 may be fitted into the inner tube 70; and an outer perimeter of the gasket 240 may provide a seal with an interior surface of the housing 30. The gasket 240 may also include a central, longitudinal air passage 235 in fluid communication with the inner tube 70 to define an inner passage (also referred to as a central channel or central inner passage) 120. A transverse channel 230 at a backside portion of the gasket 240 may intersect and communicate with the air passage 235 of the gasket 240. This transverse channel 230 assures communication between the air passage 235 and a space 250 defined between the gasket 240 and the first connector piece 155.

In at least one example embodiment, the first connector piece 155 may include a male threaded section for effecting the connection between the first section 15 and the second section 20.

In at least one example embodiment, at least two air inlets 55 may be included in the housing 30. Alternatively, a single air inlet 55 may be included in the housing 30. Such arrangement allows for placement of the air inlet 55 close to the connector 25 without occlusion by the presence of the first connector piece 155. This arrangement may also reinforce the area of air inlets 55 to facilitate precise drilling of the air inlets 55.

In at least one example embodiment, the air inlets 55 may be provided in the connector 25 instead of in the housing 30. In other example embodiments, the connector 25 may not include threaded portions.

In at least one example embodiment, the at least one air inlet 55 may be formed in the housing 30, adjacent the connector 25 to minimize the chance of an adult vaper's fingers occluding one of the ports and to control the resistance-to-draw (RTD) during vaping. In at least one example embodiment, the air inlet 55 may be machined into the housing 30 with precision tooling such that their diameters are closely controlled and replicated from one e-vaping device 10 to the next during manufacture.

In at least one example embodiment, the air inlets 55 may be sized and configured such that the e-vaping device 10 has a resistance-to-draw (RTD) in the range of from about 60 mm $H_2O$ to about 150 mm $H_2O$ (e.g. about 70 mm $H_2O$ to about 140 mm $H_2O$, about 80 mm $H_2O$ to about 130 mm $H_2O$, or about 90 mm $H_2O$ to about 120 mm $H_2O$). The size and number of air inlets 55 may be adjusted to adjust the RTD.

In at least one example embodiment, a nose portion 110 of a gasket 65 may be fitted into a first end portion 105 of the inner tube 70. An outer perimeter of the gasket 65 may provide a substantially tight seal with an interior surface 125 of the housing 30. The gasket 65 may include a central channel 115 disposed between the inner passage 120 of the inner tube 70 and the interior of the mouth-end insert 35, which may transport the vapor from the inner passage 120 to the mouth-end insert 35. The mouth-end insert 35 includes at least two outlets 100, which may be located off-axis from the longitudinal axis of the e-vaping device 10. The outlets 100 may be angled outwardly in relation to the longitudinal axis of the e-vaping device 10. The outlets 100 may be substantially uniformly distributed about the perimeter of the mouth-end insert 35 so as to substantially uniformly distribute vapor.

In at least one example embodiment, the space defined between the gasket 65, the gasket 240, the housing 30, and the inner tube 70 may establish the confines of the reservoir 95. The reservoir 95 may contain a pre-vapor formulation, and optionally a storage medium (not shown) configured to store the pre-vapor formulation therein. The storage medium may include a winding of cotton gauze or other fibrous material about the inner tube 70.

The inner tube 70 may have an outer diameter ranging from about 2.0 mm to about 3.5 mm. The outer diameter may be chosen to maximize a size of the reservoir 95.

In at least one example embodiment, the reservoir 95 may at least partially surround the inner passage 120. Thus, the reservoir 95 may at least partially surround the inner passage 120. The heating element 85 may extend transversely across the inner passage 120 between opposing portions of the reservoir 95. In some example embodiments, the heater 85 may extend parallel to a longitudinal axis of the inner passage 120. In other example embodiments, the heating element 85 may not be in the inner passage 120 of the inner tube 70.

In at least one example embodiment, the reservoir 95 may be sized and configured to hold enough pre-vapor formulation such that the e-vaping device 10 may be configured for vaping for at least about 200 seconds. Moreover, the e-vaping device 10 may be configured to allow each puff to last a maximum of about 5 seconds.

In at least one example embodiment, the storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section which has a Y-shape, cross shape, clover shape or any other suitable shape. In at least one example embodiment, the reservoir 95 may include a filled tank lacking any storage medium and containing only pre-vapor formulation.

During vaping, pre-vapor formulation may be transferred from the reservoir 95 and/or storage medium to the proximity of the heating element 85 via capillary action of the wick 90. The wick 90 may include at least a first end portion and a second end portion, which may extend into opposite sides of the reservoir 95. The heating element 85 may at least partially surround a central portion of the wick 90 such that when the heating element 85 is activated, the pre-vapor formulation in the central portion of the wick 90 may be vaporized by the heating element 85 to form a vapor.

In at least one example embodiment, the wick 90 may include a sheet of wicking material having a capacity to draw the pre-vapor formulation. In at least one example embodiment, the wick 90 may include one or more sheets of material, such as a sheet formed of borosilicate fibers. The sheet of material may be folded, braided, twisted, adhered together, etc. to form the wick 90. The sheet of material may include one or more layers of material. The sheet of material may be folded and/or twisted. If multiple layers of material are included, each layer may have a same density or a different density than other layers. The layers may have a same thickness or a different thickness. The wick 90 may have a thickness ranging from about 0.2 mm to about 2.0 mm (e.g., about 0.5 mm to about 1.5 mm or about 0.75 mm to about 1.25 mm). In at least one example embodiment, the wick 90 includes braided amorphous silica fibers.

A thicker wick 90 may deliver a larger quantity of pre-vapor formulation to the heating element 85 so as to produce a larger amount of vapor, while a thinner wick 90 may deliver a smaller quantity of pre-vapor formulation to the heating element 85 so as to produce a smaller amount of vapor.

In at least one example embodiment, the wick 90 may include a stiff, structural layer and at least one additional less rigid layer. The addition of a stiff, structural layer may aid in automated manufacture of the cartridge. The stiff, structural layer could be formed of a ceramic or other substantially heat resistant material.

In other example embodiments, the wick 90 may be a bundle of glass (or ceramic) filaments, a bundle including a group of windings of glass filaments, etc., all of which arrangements may be capable of drawing pre-vapor formulation via capillary action by interstitial spacings between the filaments. The filaments may be generally aligned in a direction perpendicular (transverse) to the longitudinal direction of the e-vaping device 10. In at least one example embodiment, the wick 90 may include one to eight filament strands, each strand comprising a plurality of glass filaments twisted together. The end portions of the wick 90 may be flexible and foldable into the confines of the reservoir 95. The filaments may have a cross-section that is generally cross-shaped, clover-shaped, Y-shaped, or in any other suitable shape.

In at least one example embodiment, the wick 90 may include any suitable material or combination of materials. Examples of suitable materials may be, but not limited to, glass, ceramic- or graphite-based materials. The wick 90 may have any suitable capillarity drawing action to accommodate pre-vapor formulations having different physical properties such as density, viscosity, surface tension and vapor pressure. The wick 90 may be non-conductive.

In at least one example embodiment, the heating element 85 may include a folded metal sheet (discussed below with respect to FIGS. 3A, 3B, and 4), which at least partially surrounds the wick 90. The heating element 85 may extend fully or partially along a length of the wick 90. The heating element 85 may further extend fully or partially around the circumference of the wick 90. In some example embodiments, the heating element 85 may or may not be in contact with the wick 90.

In at least one example embodiment, the heating element 85 may be formed of any suitable electrically resistive materials. Examples of suitable electrically resistive materials may include, but not limited to, copper, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heating element 85 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heating element 85 may include at least one material selected from the group consisting of stainless steel, copper, copper alloys, nickel-chromium alloys, super alloys and combinations thereof. In an example embodiment, the heating element 85 may be formed of nickel-chromium alloys or iron-chromium alloys. In another example embodiment, the heating element 85 may be a ceramic heater having an electrically resistive layer on an outside surface thereof.

The inner tube 70 may include a pair of opposing slots, such that the wick 90 and the first and second electrical leads 225, 225' or ends 260, 260' of the heating element 85 may extend out from the respective opposing slots. The provision of the opposing slots in the inner tube 70 may facilitate placement of the heating element 85 and wick 90 into position within the inner tube 70 without impacting edges of the slots and the folded section of the heating element 85. In at least one example embodiment, the inner tube 70 may have a diameter of about 4 mm and each of the opposing slots may have major and minor dimensions of about 2 mm by about 4 mm.

In at least one example embodiment, the first lead 225 is physically and electrically connected to the male threaded connector piece 155. As shown, the male threaded first connector piece 155 is a hollow cylinder with male threads on a portion of the outer lateral surface. The connector piece is conductive, and may be formed or coated with a conductive material. The second lead 225' is physically and electrically connected to a first conductive post 130. The first conductive post 130 may be formed of a conductive material (e.g., stainless steel, copper, etc.), and may have a T-shaped cross-section as shown in FIG. 2. The first conductive post 130 nests within the hollow portion of the first connector piece 155, and is electrically insulated from the first connector piece 155 by an insulating shell 135. The first conductive post 130 may be hollow as shown, and the hollow portion may be in fluid communication with the air passage 120. Accordingly, the first connector piece 155 and the first conductive post 130 form respective external electrical connection to the heating element 85.

In at least one example embodiment, the heating element 85 may heat pre-vapor formulation in the wick 90 by thermal conduction. Alternatively, heat from the heating element 85 may be conducted to the pre-vapor formulation by means of a heat conductive element or the heating element 85 may transfer heat to the incoming ambient air that is drawn through the e-vaping device 10 during vaping, which in turn heats the pre-vapor formulation by convection.

As shown in FIG. 2, the second section 20 includes a power supply 145, a control circuit 185, and a sensor 190. As shown, the control circuit 185 and the sensor 190 are disposed in the housing 30'. The control circuit 185 may include a printed circuit board 200. A female threaded second connector piece 160 forms a second end. As shown, the second connector piece 160 has a hollow cylinder shape with threading on an inner lateral surface. The inner diameter of the second connector piece 160 matches that of the outer diameter of the first connector piece 155 such that the two connector pieces 155, 160 may be threaded together to form the connection 25. Furthermore, the second connector piece 160, or at least the other lateral surface is conductive, for example, formed of or including a conductive material. As such, an electrical and physical connection occurs between the first and second connector pieces 155, 160 when connected.

As shown, a first lead 165 electrically connects the second connector piece 160 to the control circuit 185. A second lead 170 electrically connects the control circuit 185 to a first terminal 180 of the power supply 145. A third lead 175 electrically connects a second terminal 140 of the power supply 145 to the power terminal of the control circuit 185 to provide power to the control circuit 185. The second terminal 140 of the power supply 145 is also physically and electrically connected to a second conductive post 150. The second conductive post 150 may be formed of a conductive material (e.g., stainless steel, copper, etc.), and may have a T-shaped cross-section as show FIG. 2. The second conductive post 150 nests within the hollow portion of the second connector piece 160, and is electrically insulated from the second connector piece 160 by a second insulating shell 215. The second conductive post 150 may also be hollow as shown. When the first and second connector pieces 155, 160 are mated, the second conductive post 150 physically and electrically connects to the first conductive post 130. Also, the hollow portion of the second conductive post 150 may be in fluid communication with the hollow portion of the first conductive post 130.

While the first section 15 has been shown and described as having the male connector piece and the second section 20 has been shown and described as having the female connector piece, an alternative embodiment includes the opposite where the first section 15 has the female connector piece and the second section 20 has the male connector piece.

In at least one example embodiment, the power supply 145 includes a battery arranged in the e-vaping device 10. The power supply 145 may be a Lithium-ion battery or one of its variants, for example a Lithium-ion polymer battery. Alternatively, the power supply 145 may be a nickel-metal hydride battery, a nickel cadmium battery, a lithium-manganese battery, a lithium-cobalt battery or a fuel cell. The e-vaping device 10 may be vapable by an adult vapor until the energy in the power supply 145 is depleted or in the case of lithium polymer battery, a minimum voltage cut-off level is achieved.

In at least one example embodiment, the power supply 145 is rechargeable. The second section 20 may include circuitry configured to allow the battery to be chargeable by an external charging device. To recharge the e-vaping device 10, an USB charger or other suitable charger assembly may be used as described below.

In at least one example embodiment, the sensor 190 is configured to generate an output indicative of a magnitude and direction of airflow in the e-vaping device 10. The control circuit 185 receives the output of the sensor 190, and determines if (1) the direction of the airflow indicates a draw on the mouth-end insert 8 (versus blowing) and (2) the magnitude of the draw exceeds a threshold level. If these vaping conditions are met, the control circuit 185 electrically connects the power supply 145 to the heating element 85; thus, activating the heating element 85. Namely, the control circuit 185 electrically connects the first and second leads 165, 170 (e.g., by activating a heater power control transistor forming part of the control circuit 185) such that the heating element 85 becomes electrically connected to the power supply 145. In an alternative embodiment, the sensor 190 may indicate a pressure drop, and the control circuit 185 activates the heating element 85 in response thereto.

In at least one example embodiment, the control circuit 185 may also include a light 60, which the control circuit 185 activates to glow when the heating element 85 is activated and/or the battery 145 is recharged. The light 60 may include one or more light-emitting diodes (LEDs). The LEDs may include one or more colors (e.g., white, yellow, red, green, blue, etc.). Moreover, the light 60 may be arranged to be visible to an adult vaper during vaping, and may be positioned between the first end 45 and the second end 50 of the e-vaping device 10. In addition, the light 60 may be utilized for e-vaping system diagnostics or to indicate that recharging is in progress. The light 60 may also be configured such that the adult vaper may activate and/or deactivate the heater activation light 60 for privacy.

In at least one example embodiment, the control circuit 185 may include a time-period limiter. In another example embodiment, the control circuit 185 may include a manually operable switch for an adult vesper to initiate heating. The time-period of the electric current supply to the heating element 85 may be set or pre-set depending on the amount of pre-vapor formulation desired to be vaporized.

Next, operation of the e-vaping device to create a vapor will be described. For example, air is drawn primarily into the first section 15 through the at least one air inlet 55 in response to a draw on the mouth-end insert 35. The air passes through the air inlet 55, into the space 250, through the transverse channel 230 into the air passage 235, into the inner passage 120, and through the outlet 100 of the mouth-end insert 35. If the control circuit 185 detects the vaping conditions discussed above, the control circuit 185 initiates power supply to the heating element 85, such that the heating element 85 heats pre-vapor formulation in the wick 90. The vapor and air flowing through the inner passage 120 combine and exit the e-vaping device 10 via the outlet 100 of the mouth-end insert 35.

When activated, the heating element 85 may heat a portion of the wick 90 for less than about 10 seconds or less than about 1 second.

In at least one example embodiment, the first section 15 may be replaceable. In other words, once the pre-vapor formulation of the cartridge is depleted, only the first section 15 may be replaced. An alternate arrangement may include an example embodiment where the entire e-vaping device 10 may be disposed once the reservoir 95 is depleted. In at least one example embodiment, the e-vaping device 10 may be a one-piece e-vaping device.

In at least one example embodiment, the e-vaping device 10 may be about 80 mm to about 110 mm long and about 7 mm to about 8 mm in diameter. For example, in one example embodiment, the e-vaping device 10 may be about 84 mm long and may have a diameter of about 7.8 mm.

Figure 3B:
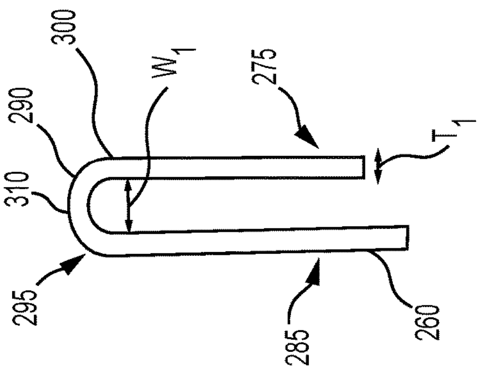
FIG. 3B is a side view of the heating element of FIG. 3A according to at least one example embodiment.
Figure 3A:
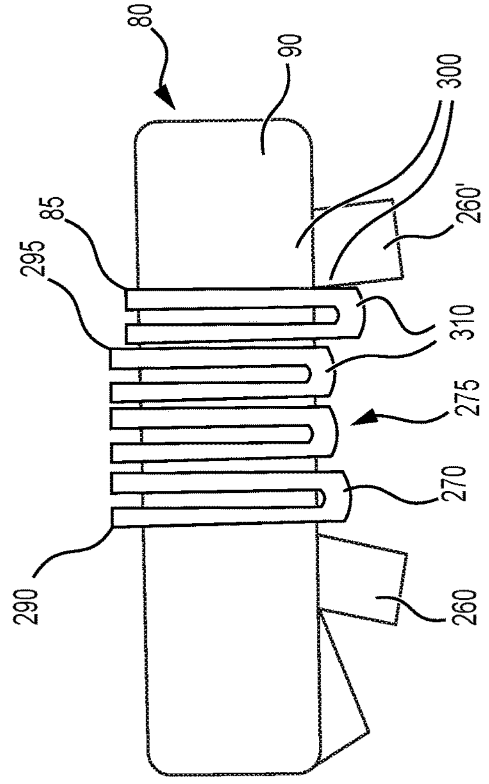
FIG. 3A is a front view of a vaporizer including a folded heating element and a wick according to at least one example embodiment.

FIG. 3A is a front view of a vaporizer including a folded heating element and a wick according to at least one example embodiment.

In at least one example embodiment, as shown in FIG. 3A, a folded heating element 85 is a single integral member that is cut and/or laser etched from a sheet of metal, which is folded about at least a portion of a wick 90. The folded heating element 85 contacts the wick 90 on three sides.

In at least one example embodiment, the folded heating element 85 includes a first plurality of U-shaped segments 270 arranged in a first direction and defining a first side 275 of the heating element 85. The folded heating element also includes a second plurality of U-shaped segments 280 arranged in the first direction and defining a second side 285 of the heating element 85 (shown in FIGS. 3B and 4 and discussed in detail below). The second side 285 is substantially parallel to the first side 275.

In at least one example embodiment, the folded heating element 85 also includes ends, which form a first lead portion 260 and a second lead portion 260'. As shown in FIG. 3A, both ends 260, 260' may be on the second side 285 of the folded heating element 85.

In at least one example embodiment, the first plurality of U-shaped segments 270, the second plurality of U-shaped segments 280, the first lead portion 260, and the second lead portion 260' are a single integral member.

In at least one example embodiment, each of the first plurality of U-shaped segments 270 is connected to at least one of the second plurality of U-shaped segments 280 by one of a third plurality of U-shaped segments 290.

In at least one example embodiment, each of the third plurality of U-shaped segments 290 includes a folded portion 295. The third plurality of U-shaped shaped segments 290 extend in a second direction. The second direction is substantially perpendicular to the first direction. Thus, the third plurality of U-shaped segments 290 extends substantially perpendicular to the first plurality of U-shaped segments 270 and the second plurality of U-shaped segments 280.

In at least one example embodiment, each of the first plurality of U-shaped segments 270 is in a first plane, and each of the second plurality of U-shaped segments 280 is in a second plane, which is different from the first plane. The first plane is substantially parallel to the second plane. In other example embodiments, the first plane may not be parallel to the second plane.

In at least one example embodiment, each of the third plurality of U-shaped segments 290 is in a different plane from other ones of the third plurality of U-shaped segments 290. Each of the third plurality of U-shaped segments 290 is in a different plane from the first plurality of U-shaped segments 270 and in a different plane from the second plurality of U-shaped segments 280. For example, the third plurality of U-shaped segments 290 extends perpendicular to the first plurality of U-shaped segments 270 and in a different plane from the second plurality of U-shaped segments 280.

In at least one example embodiment, the first plurality of U-shaped segments 270, the second plurality of U-shaped segments 280, and the third plurality of U-shaped segments 290 may each include one to twenty U-shaped segments (e.g., two to eighteen U-shaped segments, three to fifteen U-shaped segments, four to twelve U-shaped segments, or five to ten U-shaped segments). The number of U-shaped segments in each of the first plurality of U-shaped segments 270, the second plurality of U-shaped segments 280, and the third plurality of U-shaped segments 290 may be chosen depending on the desired resistance and/or the desired size of the heating element 85.

In at least one example embodiment, each one of the first plurality of U-shaped segments 270 is offset from ones of the second plurality of U-shaped segments 280. The first plurality of U-shaped segments 270 may include a same number or a different number of U-shaped segments than the second plurality of U-shaped segments 280. In at least one example embodiment, the first plurality of U-shaped segments 270 has more or less U-shaped segments than the second plurality of U-shaped segments 280.

Each of the first plurality of U-shaped segments 270 and each of the second plurality of U-shaped segments 280 include at least one side (or leg) 300 and a tip 310. The tips 310 have at least one of a rounded shape, a rectangular shape, an oval, a square shape, and a triangular shape.

In at least one example embodiment, the heating element 85 has a resistance ranging from about 0.5 ohm to about 5.0 ohms (e.g., about 1.0 ohm to about 4.5 ohms, about 2.0 ohms to about 4.0 ohms, or about 2.5 ohms to about 3.5 ohms). The resistance may be chosen based on desired vapor output and/or battery life.

FIG. 3B is a side view of the heating element of FIG. 3A according to at least one example embodiment.

In at least one example embodiment, as shown in FIG. 3B, the heating element 85 is the same as in FIG. 3A, but is shown from a side. As shown, the folded portion 295 has an inner width W1 ranging from about 0.05 mm to about 2.0 mm (e.g., about 0.5 mm to about 1.75 mm or about 0.75 mm to about 1.5 mm). The inner width W1 may vary depending upon the resistance of the heating element 85. Heating elements 85 having a lower resistance have a wider inner width W1 than heating elements 85 having a higher resistance. For example, if the heating element 85 has a resistance of about 2.9 ohms, the inner width W1 of the folded portion 295 may be about 0.25 mm to about 0.50 mm, while a heating element 285 having a resistance of about 3.5 ohms may have an inner width W1 of the folded portion 295 of about 0.5 mm to about 1.5 mm.

In at least one example embodiment, the folded portion 295 does not include sharp corners (e.g., has rounded edges and/or corners). In other example embodiments, the folded portion 295 includes sharp corners. The folded portion 295 may be substantially perpendicular to the sides 300 of the first plurality of U-shaped portions 270 and the second plurality of U-shaped portions 280.

In at least one example embodiment, the folded portion 295 is formed such that three sides of the heating element 85 contact the wick 90 so as to increase the surface area contact between the wick 90 and the heating element 85. Moreover, the inner width W1 is chosen so as to snugly hold the wick 90 between the first plurality of U-shaped portions 270 and the second plurality of U-shaped portions 280, such that only a defined amount of pre-vapor formulation reaches the heating element 85 between activations of the heating element 85.

In at least one example embodiment, the width W1 is narrow enough so that only a set amount of pre-vapor formulation can flow into the wick 90 thereby preventing too much pre-vapor formulation from reaching the heating element 85 at a given time. The narrow width W1 may also substantially prevent and/or reduce cooling of the heating element 85 by the pre-vapor formulation since only a set amount of pre-vapor formulation is able to wick to the heating element 85 at a time.

In at least one example embodiment, as shown in FIG. 3B, each of the third plurality of U-shaped segments 290 include at least one side (or leg) 300 and a tip 310. The tips 310 have at least one of a rounded shape, a rectangular shape, an oval, a square shape, and a triangular shape. The tips 310 may have an inner corner radius of about 0.10 mm to about 0.20 mm and an outer corner radius of about 0.25 mm to about 0.30 mm. The tips 310 of the third plurality of U-shaped segments 290 may have a same or different shape than the tips 310 of the first plurality of U-shaped segments 270 and the second plurality of U-shaped segments 280.

In at least one example embodiment, the heating element 85 may have a thickness T1 (shown in FIG. 3B) ranging from about 0.001 mm to about 0.20 mm (e.g., about 0.01 mm to about 0.15 mm or about 0.05 mm to about 0.10 mm).

Figure 3C:
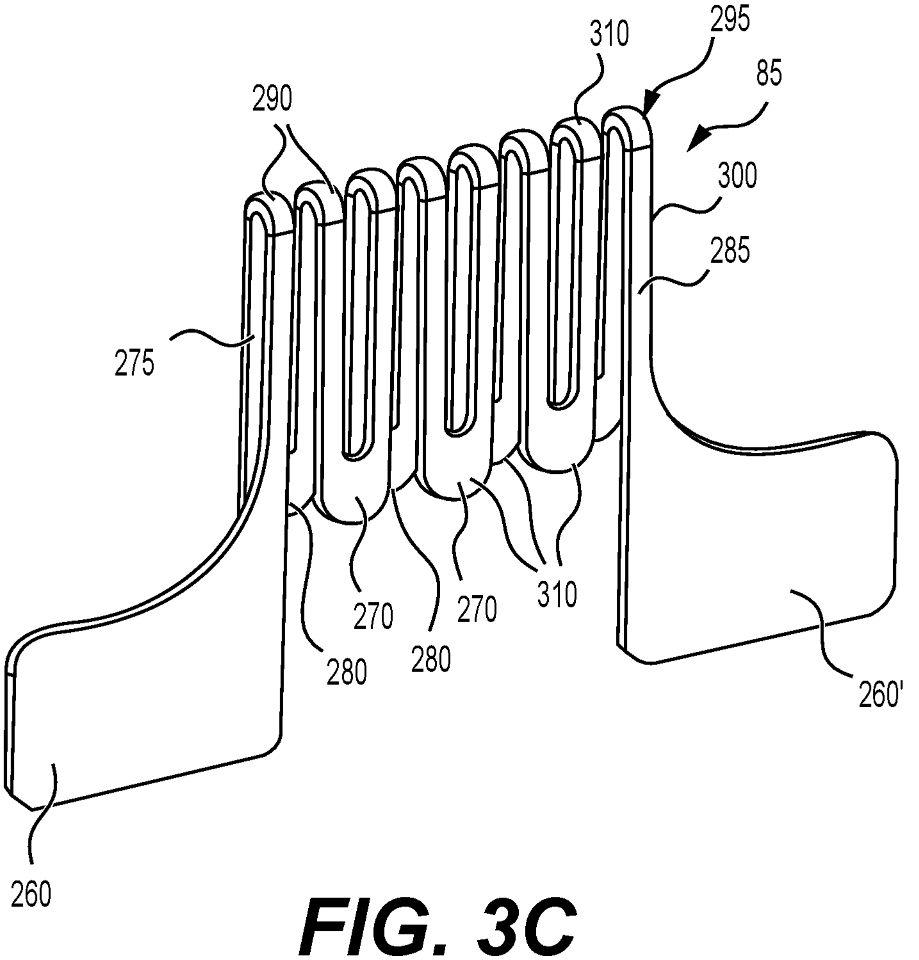
FIG. 3C is a perspective view of the heating element of FIGS. 3A and 3B according to at least one example embodiment.

FIG. 3C is a perspective view of the heating element of FIGS. 3A and 3B according to at least one example embodiment.

In at least one example embodiment, as shown in FIG. 3C, the heating element 85 is the same as in FIGS. 3A and 3B, but is shown in a perspective view. As shown, the tips 310 of the first plurality of U-shaped segments 270 are offset from the tips 310 of the second plurality of U-shaped segments 280.

In at least one example embodiment, the leads 260, 260' may be wider and/or thicker than other portions of the heating element 85 to provide rigidity, stability, resistance, and ease of spot welding.

Figure 4:
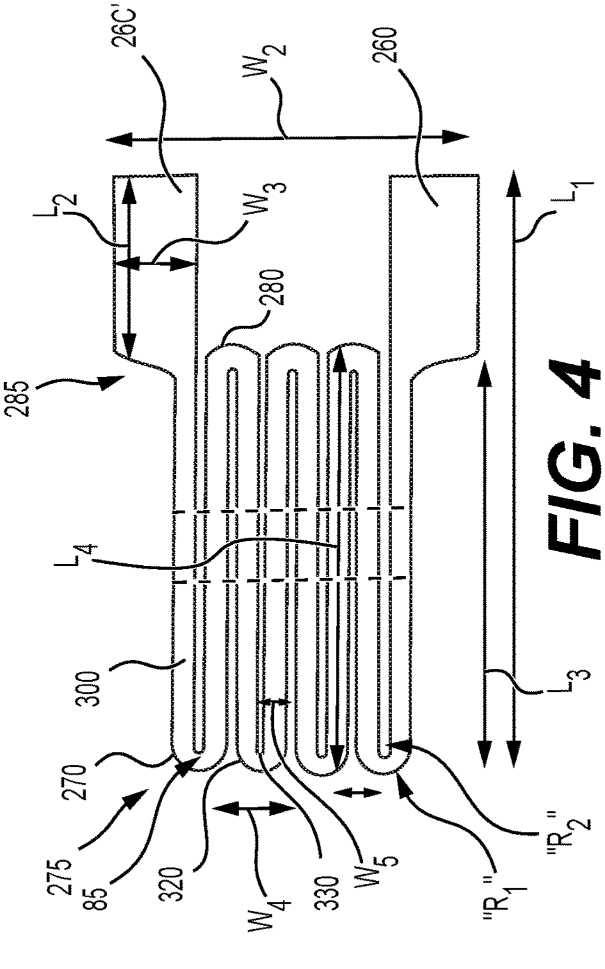
FIG. 4 is a top view of the heating element of FIG. 3 in an unfolded condition according to at least one example embodiment.

FIG. 4 is a top view of the heating element of FIG. 3A in an unfolded condition according to at least one example embodiment.

In at least one example embodiment, as shown in FIG. 4, the heating element 85 is in a flat, planar form before being folded about the wick 90. As discussed above, the heating element 85 may be cut (e.g., laser cut), stamped, and/or etched (e.g., photochemical etched) from a sheet of metal. The metal may include any suitable material including Nichrome 80, Nichrome 60, stainless steel 304, stainless steel 316, and Nicrothal 30.

In at least one example embodiment, as shown, the heating element 85, when in the unfolded condition, has a length L1 of about 4.0 mm to about 15.0 mm (e.g., about 4.5 mm to about 6.5 mm or about 5.0 mm to about 6.0 mm). The lead portions 260, 260' extend beyond the second plurality of U-shaped segments 280.

In at least one example embodiment, the lead portions 260, 260' have a width W3 ranging from about 1.0 mm to about 3.0 mm (e.g., about 1.25 mm to about 2.75 mm or about 1.75 mm to about 2.25 mm), and a length L2 ranging from about 1.0 mm to about 2.5 mm (e.g., about 1.25 mm to about 2.25 mm or about 1.75 mm to about 2.0 mm).

In at least one example embodiment, a length L3 is a length of the heating element 85 from an outer surface 320 of the tips 310 of the first plurality of U-shaped segments 270 to the outer surface 320 of the tips 310 of the second plurality of U-shaped segments 280. The length L3 ranges from about 4.5 mm to about 6.0 mm (e.g., about 4.75 mm to about 5.75 mm or about 5.0 mm to about 5.25 mm).

In at least one example embodiment, a length L4 is the length between an inner surface 330 of the tips 310 of the first plurality of U-shaped segments 270 to the inner surface 330 of the tips 310 of the second plurality of U-shaped segments 280. The length L4 ranges from about 3.25 mm to about 7.0 mm (e.g., about 4.0 mm to about 6.0 mm or about 4.5 mm to about 5.5 mm).

In at least one example embodiment, a width W4 of each of the tips 310 ranges from about 0.25 mm to about 0.50 mm.

In at least one example embodiment, a width W5 of each side 300 of the first plurality of U-shaped segments 270 and the second plurality of U-shaped segments 280 ranges from about 0.05 mm to about 0.20 mm (e.g., about 0.10 mm to about 0.15 mm).

In at least one example embodiment, the width W4 of each of the tips 310 of the first plurality of U-shaped segments 270 and the second plurality of U-shaped segments 280 is greater than the width W5 of each of the sides 300 of the first plurality of U-shaped segments 270 and the second plurality of U-shaped segments 280.

In at least one example embodiment, the first lead portion 260 and the second lead portion 260' each have a width W3 greater than the width W5 of the side 300. The width W4 of the tip 300 of each of the first plurality of U-shaped segments 270 is substantially the same as the width W4 of the tip 300 of each of the second plurality of U-shaped segments 280. The tip 300 of each of the first plurality of U-shaped segments 270 is offset from the tip 300 of each of the second plurality of U-shaped segments 280 when the heating element 85 is in the folded condition.

In at least one example embodiment, the dimensions of the heating element 85 may be adjusted to adjust the resistance of the heating element 85. The dimensions of the heating element 85 may also be adjusted to form larger or smaller heaters for use in other vaping device including the devices set forth in U.S. patent application Ser. No. 15/135,930 to Holtz et al., filed Apr. 22, 2016, U.S. patent application Ser. No. 15/135,923 to Holtz, filed Apr. 22, 2016, U.S. patent application Ser. No. 15/224,866 to Gavrielov et al., filed Aug. 1, 2016, U.S. patent application Ser. No. 14/998,020 to Hawes et al., filed Apr. 22, 2015, U.S. patent application Ser. No. 15/147,454 to Li et al., filed May 5, 2016, and U.S. patent application Ser. No. 15/135,932 to Hawes et al., filed Apr. 22, 2016, the entire contents of each of which are incorporated herein by reference thereto.

In at least one example embodiment, the heating element 85 may extend substantially perpendicular to a longitudinal axis of the electronic vaping device. In other example embodiments, the heating element 85 may be substantially parallel to the longitudinal axis of the electronic vaping device.

Figure 5:
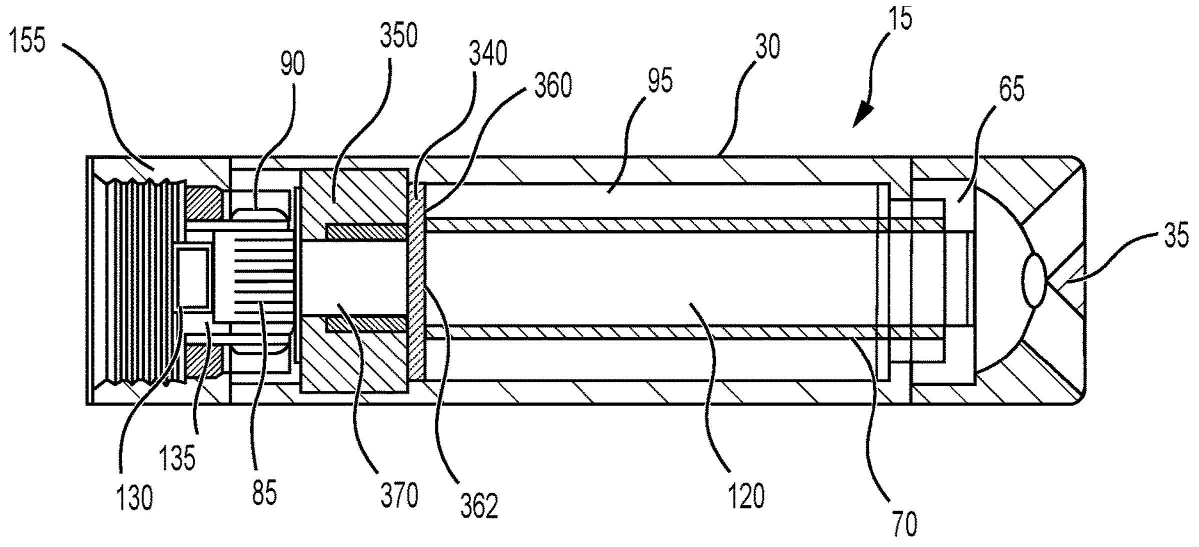
FIG. 5 is a cross-sectional view of a cartridge of an electronic vaping device including a vaporizer according to at least one example embodiment.

FIG. 5 is a cross-sectional view of a cartridge of an electronic vaping device including a vaporizer according to at least one example embodiment.

In at least one example embodiment, the first section 15 including the heating element 85 is the same as in FIG. 2, but the inner tube 70 excludes opposing slots and the heating element 85 and wick 90 are not within the inner tube 70 as discussed in detail below.

In at least one example embodiment, as shown in FIG. 5, instead of a second gasket or seal at a second end of the reservoir 95, a disk 340 is arranged between the inner tube 70 and the housing 30. Thus, the reservoir 95 is defined by the seal 65, the inner tube 70, the housing 30, and the disk 340. The disk 340 may be formed of a polymer or metal that is substantially non-porous. Weep holes 360 may be formed in the disk 340 so as to allow pre-vapor formulation from the reservoir 95 to exit the reservoir 95. The size and/or number of weep holes 260 defined in the disk 340 may be chosen based on desired pre-vapor formulation delivery amounts and/or timing. The disk 240 defines a central channel 362 in fluid communication with the inner passage 120 of the inner tube 70. The central channel 362 has about a same diameter as an inner diameter of the inner passage 120

In at least one example embodiment, a transfer material tube 350 abuts the disk 340, such that any pre-vapor formulation exiting the reservoir 95 via the weep holes 360 is transferred to the transfer material tube 350. The material used to form the transfer material tube 350 may depend on the material used to form the wick and the viscosity, density, etc. of the pre-vapor formulation. The transfer material tube 350 may have a density ranging from about 0.08 g/cc to about 0.3 g/cc.

The transfer material tube 350 defines a channel 370 that is in fluid communication with the inner passage 120 of the inner tube 70.

In at least one example embodiment, the heating element 85 is arranged between the first connector 155 and the transfer material tube 350. As vapor is formed, the vapor passes through the channel 370 and travels into the central channel 362, and into the inner passage 120.

Figure 6:
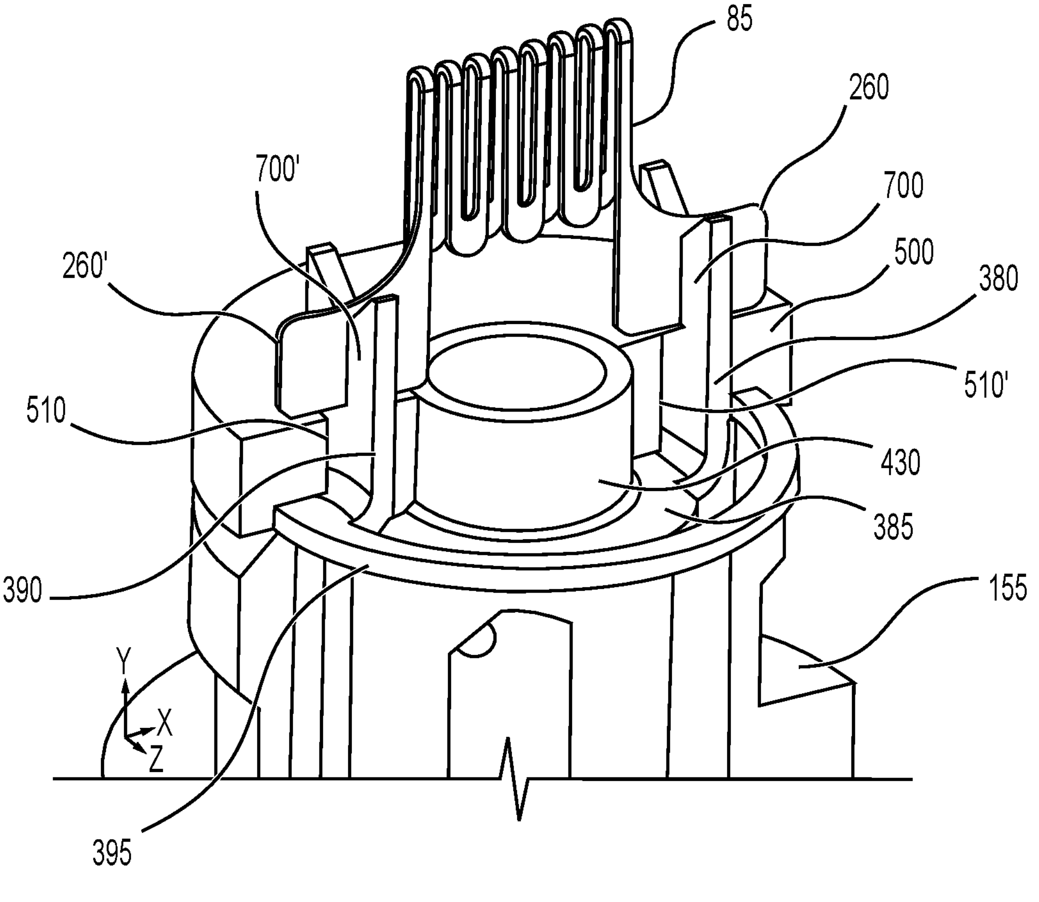
FIG. 6 is an enlarged perspective view of the vaporizer and the connector of FIG. 5 according to at least one example embodiment.

FIG. 6 is an enlarged, perspective view of the first connector of the cartridge of FIG. 5 according to at least one example embodiment.

In at least on example embodiment, as shown in FIG. 6, the first connector 155 may include an inner post 430. Both the connector 155 and the inner post 430 are formed of plastic. Thus, the electrical connection to the heater is made via a first connector ring 385 and a second connector ring 395. The first connector ring 385 includes a first tab 380 that extends substantially perpendicular to the first connector ring 385. The second connector ring 395 includes a second tab 390 that extends substantially perpendicular to the second connector ring 395. Each of the first tab 380 and the second tab 390 defines a slot therein, which is sized and configured to receive one of the tabs 260, 260'.

In at least one example embodiment, the first connector ring 385 and the second connector ring 395 are electrically separated from each other by a separation disk 500. FIG. 6 shows only a portion of the separation disk 500 to show the first connector ring 385 and the second connector ring 395. The separation disk 500 defines two slots 510, 510' therein. The first tab and the second tab 380, 390 each extend through or of the two slots 510, 510' in the separation disk 500. Moreover, the first connector ring 385 and the second connector ring 395 have different inner and/or outer diameters to that one is smaller than the other and does not contact the other even when nested together.

In at least one example embodiment, the first and second connector rings 385, 395 allow for the formation of the electrical connection with the heating element 85 without the need for crimping and/or soldering. In other example embodiments, the ends 260, 260' may be held in the slots 700, 700' defined by the first and second connecting tabs 380, 390, while also being crimped and/or soldered for added strength. The tabs 380, 390 may have a guiding surface that converges (e.g., are dovetailed) to the slots 700, 700' for ease of placement of the heating element tabs 260, 260' therein. Thus, the slots 700, 700' further facilitate automated manufacture of the electronic vaping device.

Figure 7:
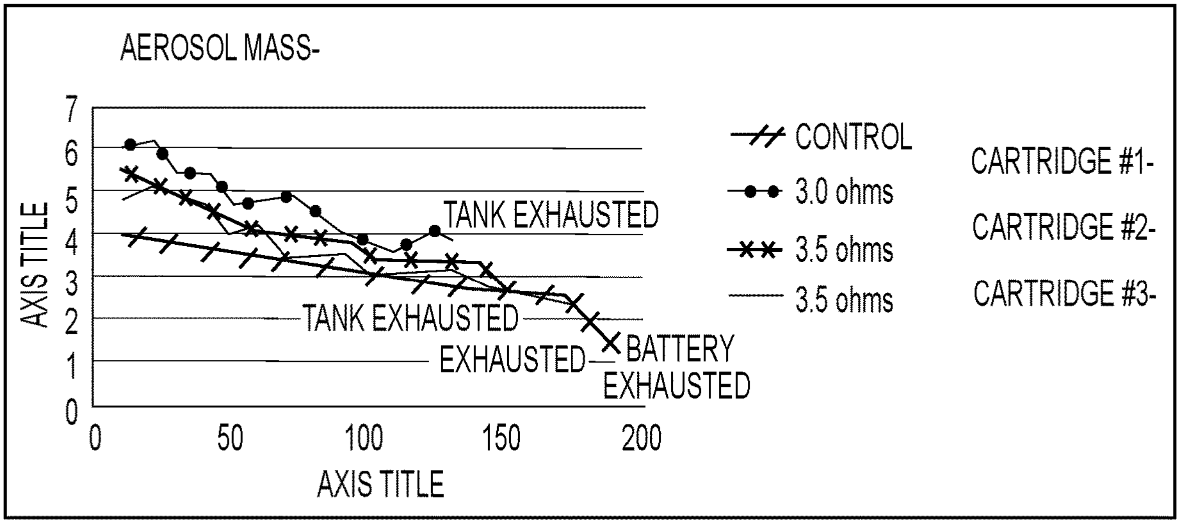
FIG. 7 is a graph illustrating aerosol output and battery exhaustion of an electronic vaping device including a vaporizer including a folded heating element according to at least one example embodiment.

FIG. 7 is a graph illustrating aerosol output and battery exhaustion of an electronic vaping device including a vaporizer including a folded heating element according to at least one example embodiment.

A MarkTen XL electronic vaping device was compared to (1) a first vaping device including the battery section of the MarkTen XL, a cartridge as set forth in FIGS. 5 and 6, and the heating element of FIGS. 3A, 3B, and 4 having a resistance of about 3.0 ohms, (2) a second vaping device including the battery section of the MarkTen XL, a cartridge as set forth in FIGS. 5 and 6, and the heating element of FIGS. 3A, 3B, and 4 having a resistance of about 3.5 ohms, and (3) a third vaping device including the battery section of the MarkTen XL, a cartridge as set forth in FIGS. 5 and 6, and the heating element of FIGS. 3A, 3B, and 4 having a resistance of about 3.5 ohms. The first, second, and third vaping devices included 3.0 mm internal diameter inner tubes and the transfer material was formed of an Essentra pad having a density of about 0.115 g/cc. The wick of the first vaping device was formed from an Ahlstrom Grade 181 wick material. The wick of the second and third vaping devices was formed of Sterlitech 934-AH wick material. Each of the four tested cartridges was filled with. MarkTen XL classic formulation.

Each vaping device was test using a Mettler AE240 Balance (used to weight pads to determine amount of aerosol collected), Serial number GS9700, PM03715, a Fluke 287 RMS Multimeter, a Borgwaldt PV 10 RTD Machine, and a Borgwaldt Single Port Smoking Machine. The Single Port Smoking Machine was set to a four second duration, a 55 cc puff volume with a 26 second delay between puffs. 10 puffs were taken per measurement, and the cartridges were oriented to ensure that the wicks were fully saturated. The batteries of each device were fully charged prior to testing.

As shown in FIG. 7, the MarkTen XL provides substantially consistent aerosol mass over initial puffs and a battery life that lasts for at least about 150 puffs. In comparison, the vaping device including the heating element having a resistance of 3.0 ohms provided a higher aerosol mass over the initial puffs, but a shorter battery life than the MarkTen XL. The vaping devices including the heating element having a resistance of about 3.5 ohms provided higher aerosol mass than the MarkTen XL, while still providing a battery life that exceeded 150 puffs.

Figure 8:
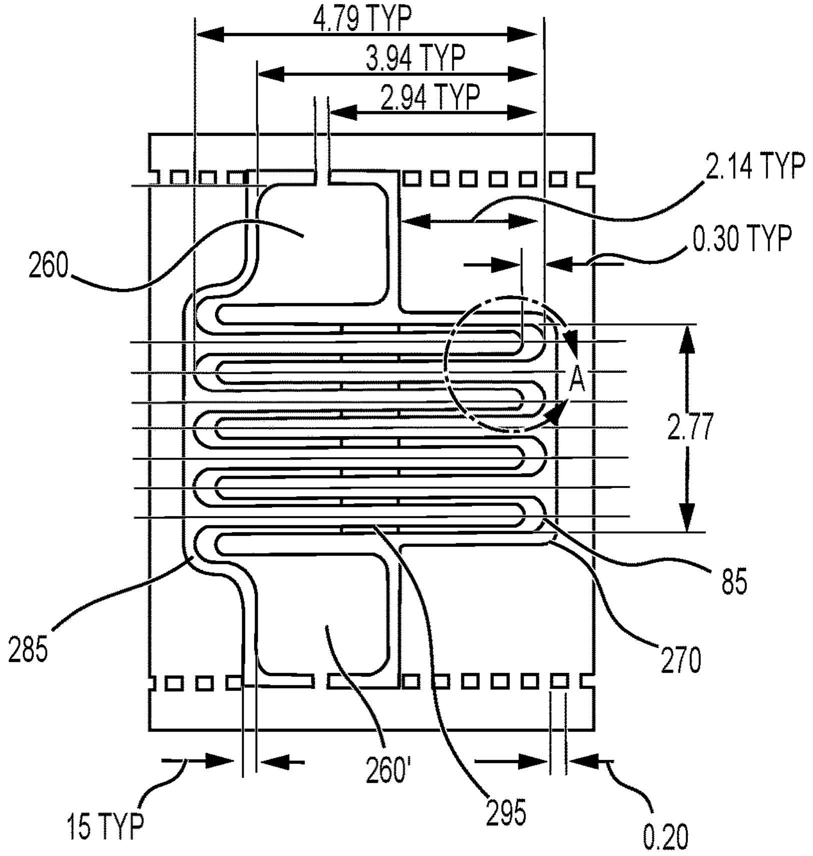
FIG. 8 is an illustration of a heating element etched into a sheet of material according to at least one example embodiment.

FIG. 8 is an illustration of a heating element etched into a sheet of material according to at least one example embodiment.

In at least one example embodiment, the heating element may be etched using a photochemical etching and cleaning process. The photochemical etching process may be accomplished in an electrolytic bath containing a mixture of diluted inorganic acids.

In at least one example embodiment, the photochemical etching and cleaning process may include cleaning surfaces of the material using alcohol. A photo resistant dray film may be applied to surfaces of the material by lamination at a temperature of about 80° C. The raw material coated with Dray Film may be exposed through the plate with vacuum contact using UV light. The plate may be developed with a solvent solution in a development machine. The plate is then cleaned of remnants and residual solvent solution. The raw material plate may then be etched in an etching machine using an acidic solvent including ferric chloride with other additives. The photo resistance material is removed using a basic solvent, such as sodium carbonate, and the plate is rinsed with water, dried, and inspected for quality.

In at least one example embodiment, as shown in FIG. 8, the heating element 85 is the same as in FIGS. 3A, 3B, and 4, but the ends 260, 260' are generally square in shape and extend, such that when the heating element 85 is folded, the ends 260, 260' are along the folded portion 295.

Figure 9:
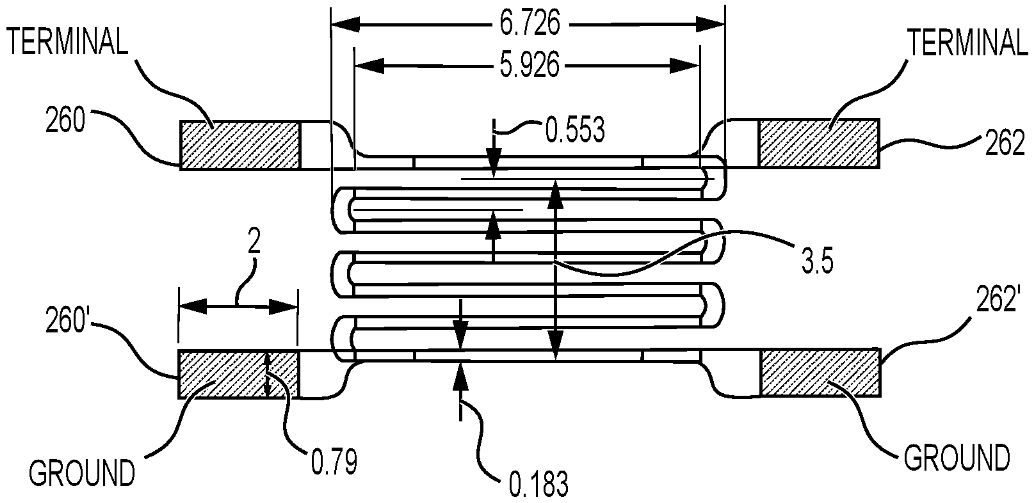
FIG. 9 is an illustration of a heating element in an unfolded condition according to at least one example embodiment.

FIG. 9 is an illustration of a heating element in an unfolded condition according to at least one example embodiment.

In at least one example embodiment, as shown in FIG. 9, the heating element 85 is the same as in FIGS. 3A, 3B, and 4, but the heating element includes the ends 260, 260' and additional ends 262, 262'. The addition of the ends 262, 262' allows for a more secure electrical connection with the heating element 85.

A cartridge may include additional electrical leads and/or slots (shown in FIG. 6 to receive the additional ends 262, 262'.

Figure 10:
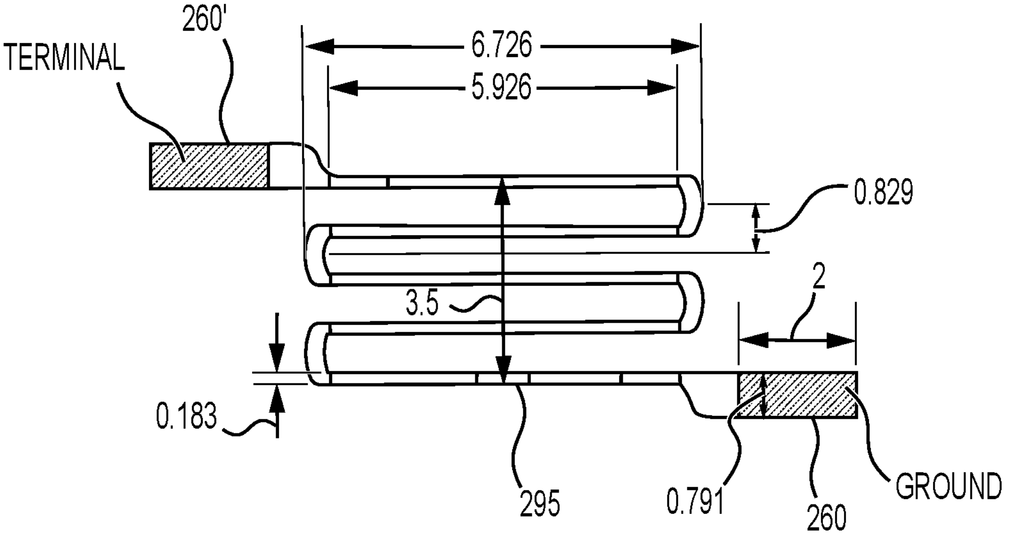
FIG. 10 is an illustration of a heating element in an unfolded condition according to at least one example embodiment.

FIG. 10 is an illustration of a heating element in an unfolded condition according to at least one example embodiment.

In at least one example embodiment, as shown in FIG. 10, the heating element 85 is the same as in FIGS. 3A, 3B, and 4, but the ends 260, 260' extend from opposite sides of the folded portion 295.

The cartridge may be adapted to receive ends 260, 260' that are in different planes.

Figure 11:
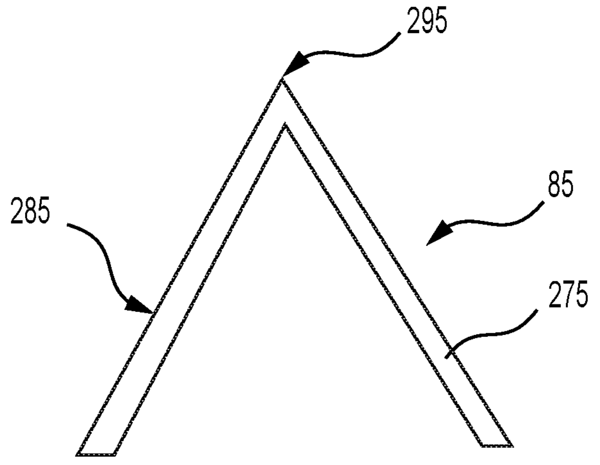
FIG. 11 is a side view of a heating element according to at least one example embodiment.

FIG. 11 is a side view of a heating element according to at least one example embodiment.

In at least one example embodiment, as shown in FIG. 11, the heating element 85 is the same as in FIGS. 3A, 3B, and 4, but the first side 275 is at an angle to the second side 285, and the folded portion 295 includes a single fold, such that the folded heating element 85 is substantially V-shaped when viewed from a side. The first side 275 may be at an angle of about to about 90° to the second side 285 (e.g., about 10° to about 80°, about 20° to about 70°, about 30° to about 60°, or about 40° to about 50°).

Figure 12:
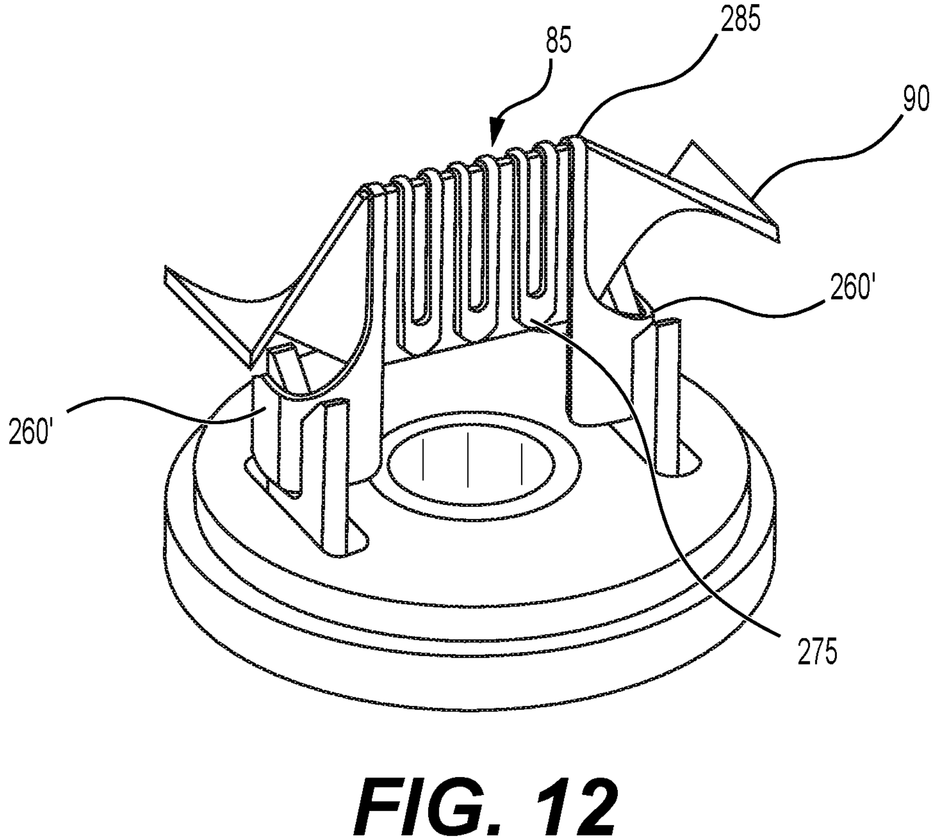
FIG. 12 is a perspective view of a heating element and a wick according to at least one example embodiment.

FIG. 12 is a perspective view of a heating element and a wick according to at least one example embodiment.

In at least one example embodiment, as shown in FIG. 12, the heating element 85 is the same as in FIGS. 3A, 3B, and 4, but the ends 260, 260' extend from the first side 275 and are bent such that the ends 260, 260' are substantially perpendicular to the first side 275. In addition, the wick 90 may include one or more twisted portions, which extend beyond edges of the heating element 85.

Figure 13:
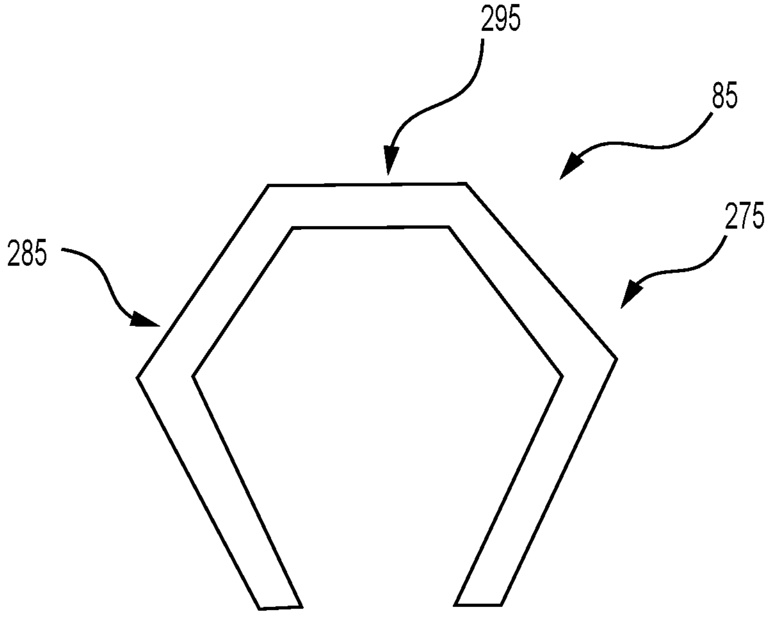
FIG. 13 is a side view of a heating element according to at least one example embodiment.

FIG. 13 is a side view of a heating element according to at least one example embodiment.

In at least one example embodiment, as shown in FIG. 13, the heating element 85 is the same as in FIGS. 3A, 3B, and 4, but the first side 275 and the second side 285 may be bowed and/or bent, such that the first side 275 is not parallel to the second side 285. The bowed and/or bent shape of the first side 275 and the second side 285 may accommodate a thicker wick 90.

Figure 14:
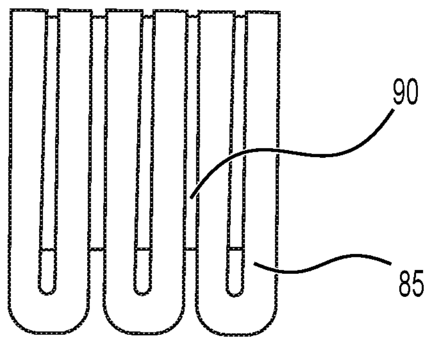
FIG. 14 is a front view of a heating element and a wick according to at least one example embodiment.

FIG. 14 is a front view of a heating element and a wick according to at least one example embodiment.

In at least one example embodiment, as shown in FIG. 14, the heating element 85 is the same as in FIGS. 3A, 3B, and 4, except that the wick 90 does not extend beyond edges of the heating element 85.

Figure 15:
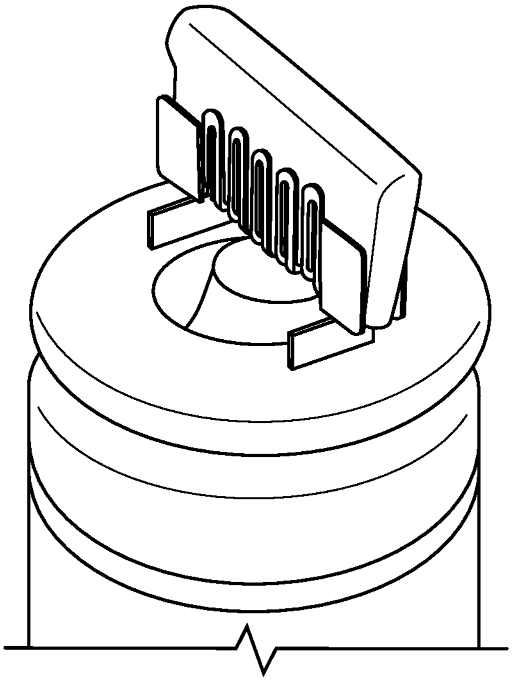
FIG. 15 is a perspective view of a heating element and a wick according to at least one example embodiment.

FIG. 15 is a perspective view of a heating element and a wick according to at least one example embodiment.

In at least one example embodiment, as shown in FIG. 15, the heating element 85 is the same as in FIGS. 3A, 3B, and 4, except that the wick 90 extends beyond edges of the heating element 85.

Figure 16:
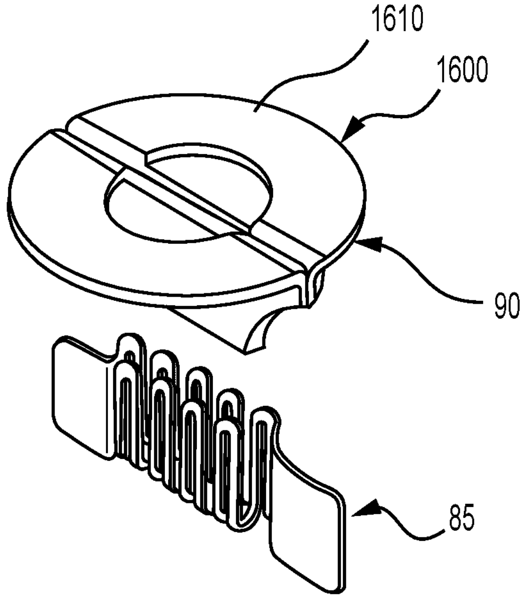
FIG. 16 is a perspective view of a heating element and a wick according to at least one example embodiment.

FIG. 16 is a perspective view of a heating element and a wick according to at least one example embodiment.

In at least one example embodiment, as shown FIG. 16, the heating element and wick may be the same as in FIGS. 3A and 5, except that the wick has a top portion 1600 having an end surface 1610 that is about a same size and shape as the transfer material 350, such that the wick 90 may extends at least partially along an end surface of the transfer material 350.

Figure 17:
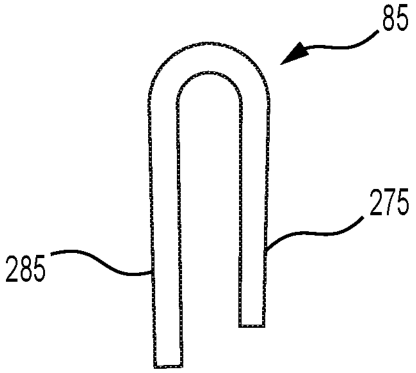
FIG. 17 is a side view of a heating element according to at least one example embodiment.

FIG. 17 is a side view of a heating element according to at least one example embodiment.

In at least one example embodiment, as shown in FIG. 17, the heating element 85 is the same as in FIGS. 3A, 3B, and 4, except that the second side 285 of the heating element 85 is longer than the first side 275 of the heating element 85. In other example embodiments, not shown, the first side 275 and/or the second side 285 may be concave and/or convex.

Figure 18:
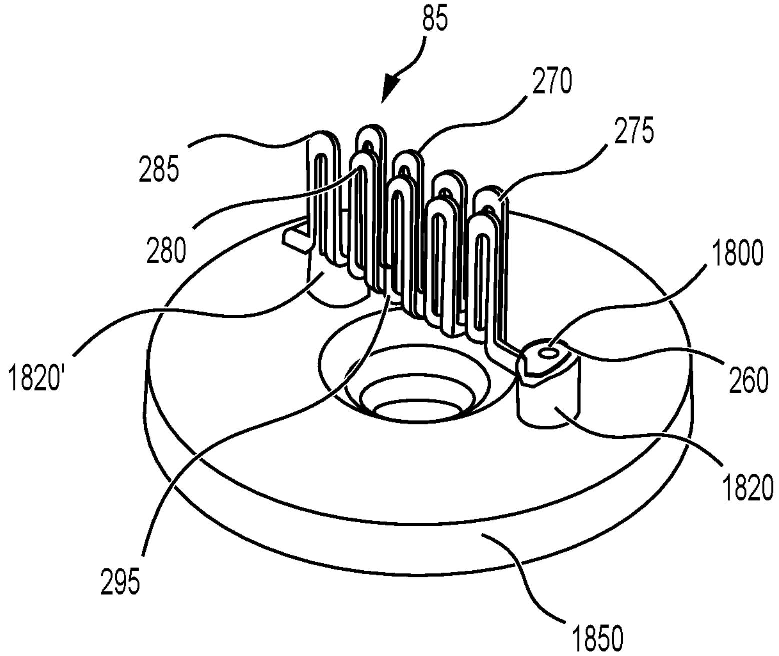
FIG. 18 is a perspective view of a heating element and a wick according to at least one example embodiment.

FIG. 18 is a perspective view of a heating element and a wick according to at least one example embodiment.

In at least one example embodiment, as shown in FIG. 18, the heating element 85 is substantially the same as in FIG. 6, except that the tabs 260, 260' are adjacent the folded portion 295, the first plurality of U-shaped segments 270 and the second plurality of U-shaped segments 280 extend towards the reservoir (not shown), and the tabs 260, 260' are bent, such that the tabs 260, 260' are substantially parallel to the folded portion 295. Moreover, each of the tabs 260, 260' includes a hole 1800 therethrough. During manufacture, the tabs 260, 260' may be spot welded to pins 1820, 1820'. The holes 1800 provide a line of sight for ease of spot welding during manufacture. The pin 1820 is electrically insulated from the pin 1820' as shown and described with respect to FIG. 19.

Because the greatest amount of heat may be generated at the folded portion 295, placing the folded portion 295 closest to location air enters allows for efficient movement of airflow and heat.

Figure 19:
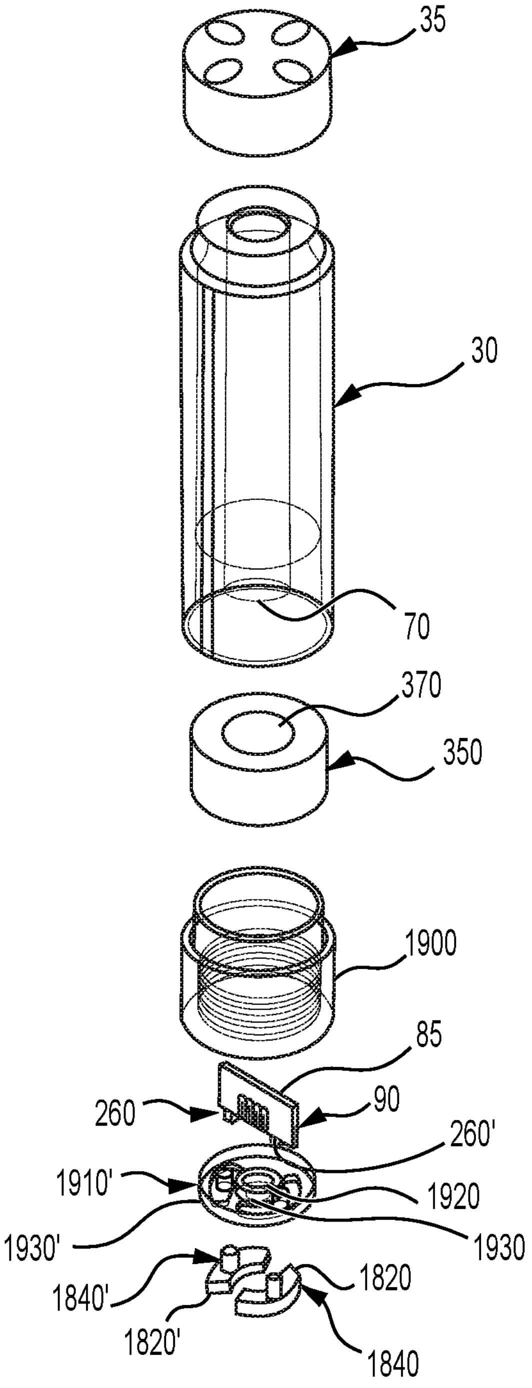
FIG. 19 is an exploded view of a cartridge according to at least one example embodiment.

FIG. 19 is an exploded view of a cartridge according to at least one example embodiment.

In at least one example embodiment, as shown in FIG. 19, the cartridge is the same as the cartridge of FIGS. 5 and 6, except that the tabs 260, 260' contact pins 1820, 1820' instead of first and second connecting brackets 380, 390. As shown, the connector piece 1900 houses a disk of insulating material 1910, which defines an air channel 1920 therethrough. The air channel 1920 is in fluid communication with the channel 370 in the transfer material 350. Two arcuately shaped bars 1840, 1840' fit against the disk of insulating material 1920. Each bar 1840, 1840' includes one of the pins 1820, 1820' extending from a top surface of each of the bars 1840, 1840'. The pins 1820, 1820' extend through respective ones of pin-holes 1930, 1930' defined in the disk of insulating material 1920.

In addition, the housing 30 may be integrally formed with the inner tube 70, such that the gasket is not needed. The housing 30 and the inner tube 70 may connect at a transverse, end wall defining an outlet therein. The mouth-end insert 35 may be fitted around an end portion of the housing 30, such that the outlet in the end wall is in fluid communication with outlets in the mouth-end insert 35.

Example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A folded heater of an electronic vaping device comprising:

a first plurality of U-shaped segments arranged in a first direction and defining a first side of the folded heater, the first side defining a flat plane;

a second plurality of U-shaped segments arranged in the first direction and defining a second side of the folded heater, the second plurality of U-shaped segments defining a flat plane parallel to the first side, the folded heater having a width ranging from 0.5 mm to 1.75 mm between the first side and the second side;

a first lead portion;

a third plurality of U-shaped segments connecting the first plurality of U-shaped segments to at least one of the second plurality of U-shaped segments;

a second lead portion;

a third lead portion;

a fourth lead portion, the first plurality of U-shaped segments, the second plurality of U-shaped segments, the first lead portion, the second lead portion, the third lead portion, and the fourth lead portion being a single integral member, the first lead portion and the second lead portion being on the second side and arranged in the first direction parallel to the first plurality of U-shaped segments and the second plurality of U-shaped segments, the first lead portion and the second lead portion each connected to at least one of the second plurality of U-shaped segments and arranged to be co-planar with the second side defined by the second plurality of U-shaped segments, the third lead portion and the fourth lead portion each connected to at least one of the first plurality of U-shaped segments and arranged to be co-planar with the first side defined by the first plurality of U-shaped segments.

2. The folded heater of claim 1, wherein each of the third plurality of U-shaped segments includes a folded portion, the third plurality of U-shaped segments extending in a second direction, the second direction being perpendicular to the first direction.

3. The folded heater of claim 2, wherein each of the first plurality of U-shaped segments, each of the second plurality of U-shaped segments, and each of the third plurality of U-shaped segment includes at least one side and a tip.

4. The folded heater of claim 3, wherein each of the tips has at least one of a rounded shape, a rectangular shape, a square shape, and a triangular shape.

5. The folded heater of claim 3, wherein a width of each of the tips of the first plurality of U-shaped segments, the second plurality of U-shaped segments, and the third plurality of U-shaped segments is greater than a width of each of the sides of the at least one of the first plurality of U-shaped segments, the second plurality of U-shaped segments, and the third plurality of U-shaped segments.

6. The folded heater of claim 3, wherein a width of each of the tips ranges from 0.25 mm to 0.50 mm.

7. The folded heater of claim 6, wherein a width of each of the side ranges from 0.05 mm to 0.20 mm.

8. The folded heater of claim 7, wherein the first lead portion and the second lead portion each have a width greater than the width of the side.

9. The folded heater of claim 8, wherein the width of the first lead portion and the second lead portion ranges from 1.0 mm to 3.0 mm.

10. The folded heater of claim 6, wherein the width of the tip of the at least one of the first plurality of U-shaped segments is the same as the width of the tip of the at least one of the second plurality of U-shaped segments.

11. The folded heater of claim 3, wherein the tip of the at least one of the first plurality of U-shaped segments is offset from the tip of the at least one of the second plurality of U-shaped segments.

12. The folded heater of claim 1, wherein the first plurality of U-shaped segments is spaced apart from the second plurality of U-shaped segments by a minimum distance ranging from 0.5 mm to 2.0 mm.

13. The folded heater of claim 1, wherein the folded heater has a resistance ranging from 0.5 ohms to 5.0 ohms.

14. The folded heater of claim 1, wherein the folded heater is formed of Nichrome.

15. The folded heater of claim 1, wherein the folded heater has a thickness ranging from 0.05 mm to 0.50 mm.

16. The folded heater of claim 1, wherein the first plurality of U-shaped segments are in a first plane and the second plurality of U-shaped segments are in a second plane, the second plane being different from the first plane.

17. The folded heater of claim 1, wherein each of the first plurality of U-shaped segments and each of the second plurality of U-shaped segments includes at least one side and a tip, the tip having at least one of a rounded shape, a rectangular shape, a square shaped, and a triangular shape.

18. A cartridge of an electronic vaping device comprising:
a reservoir configured to store a pre-vapor formulation;
a wick in fluid communication with the reservoir; and
a folded heater partially surrounding a portion of the wick, the folded heater including,
a first plurality of U-shaped segments arranged in a first direction and defining a first side of the folded heater, the first side defining a flat plane,
a second plurality of U-shaped segments arranged in the first direction and defining a second side of the folded heater, the second side defining a flat plane parallel to the first side, the folded heater having a width ranging from 0.5 mm to 1.75 mm between the first side and the second side,
a first lead portion,
a second lead portion,
a third lead portion,
a fourth lead portion, and
a third plurality of U-shaped segments connecting the first plurality of U-shaped segments to at least one of the second plurality of U-shaped segments, the first plurality of U-shaped segments, the second plurality of U-shaped segments, the third plurality of U-shaped segments, the first lead portion the second lead portion, the third lead portion and the fourth lead portion being a single integral member, the first lead portion and the second lead portion being on the second side and arranged in the first direction parallel to the first plurality of U-shaped segments and the second plurality of U-shaped segments, the first lead portion and the second lead portion each connected to at least one of the second plurality of U-shaped segments and extending in the plane defined by the second plurality of U-shaped segments, the third lead portion and the fourth lead portion each connected to at least one of the first plurality of U-shaped segments and extending in the plane defined by the first plurality of U-shaped segments.

19. The cartridge of claim 18, wherein the first plurality of U-shaped segments are in a first plane and the second plurality of U-shaped segments are in a second plane, the second plane being different from the first plane.

20. An electronic vaping device comprising:
a reservoir configured to store a pre-vapor formulation;
a wick in fluid communication with the reservoir;
a folded heater partially surrounding a portion of the wick, the folded heater including,
a first plurality of U-shaped segments arranged in a first direction and defining a first side of the folded heater, the first side defining a flat plane,
a second plurality of U-shaped segments arranged in the first direction and defining a second side of the folded heater, the second side defining a flat plane parallel to the first side, the folded heater having a width ranging from 0.5 mm to 1.75 mm between the first side and the second side
a third plurality of U-shaped segments connecting the first plurality of U-shaped segments to at least one of the second plurality of U-shaped segments,
a first lead portion,
a second lead portion
a third lead portion, and
a fourth lead portion, the first plurality of U-shaped segments, the second plurality of U-shaped segments, third plurality of U-shaped segments, the first lead portion, the second lead portion, the third lead portion, and the fourth lead portion being a single integral member, the first lead portion and the second lead portion being on the second side and arranged in the first direction parallel to the first plurality of U-shaped segments and the second plurality of U-shaped segments, the first lead portion and the second lead portion each connected to at least one of the second plurality of U-shaped segments and extending in the plane defined by the second plurality of U-shaped segments, the third lead portion and the fourth lead portion each connected to at least one of the first plurality of U-shaped segments and extending in the plane defined by the first plurality of U-shaped segments; and a power supply electrically connectable to the folded heater.

21. A folded heater comprising:

a first plurality of U-shaped portions extending in a first direction, such that the first plurality of U-shaped portions have U-shaped tips disposed in different planes, each of a number of the first plurality of U-shaped portions having a first leg and a second leg, the first leg connected a second leg of a previous one of the first plurality of U-shaped portions by one of a second plurality of U-shaped portions, the second leg connected to a subsequent leg by one of a third plurality of U-shaped portions, the second plurality of U-shaped portions forming a first side of the folded heater, the third plurality of U-shaped portions forming a second side of the folded heater, the first side defining a flat plane and the second side defining a second flat plane, the folded heater having a width ranging from 0.5 mm to 1.75 mm between the first side and the second side, and the first side being parallel to the second side;

a first lead portion;

a second lead portion;

a third lead portion; and a fourth lead portion, the first lead portion and the second lead portion each connected to at least one of the second plurality of U-shaped portions and extending in the plane defined by the second plurality of U-shaped portions, the third and fourth lead portion each connected to at least one of the third plurality of U-shaped portions and extending in the plane defined by the third plurality of U-shaped portions.

22. The folded heater of claim 21, wherein each of the first plurality of U-shaped portions is in a different plane.

23. The folded heater of claim 21, wherein each of the second plurality of U-shaped portions is in a first plane and each of the third plurality of U-shaped portions is in a second plane, the first plane being different from the second plane, and the first plane and the second plane being perpendicular to each of the first plurality of U-shaped portions.

24. The folded heater of claim 1, wherein each segment of the third plurality of U-shaped segments having at least one side and a tip, the tips of the third plurality of U-shaped segments being spaced apart from the first lead portion and the second lead portion by sides of the third plurality of U-shaped segments.

* * * * *